United States Patent
Takata et al.

(10) Patent No.: US 11,570,821 B2
(45) Date of Patent: Jan. 31, 2023

(54) TRANSMISSION APPARATUS, RECEPTION APPARATUS, TRANSMISSION METHOD, AND RECEPTION METHOD

(71) Applicant: Panasonic Intellectual Property Corporation of America, Torrance, CA (US)

(72) Inventors: Tomofumi Takata, Ishikawa (JP); Takashi Iwai, Ishikawa (JP); Lilei Wang, Beijing (CN); Hidetoshi Suzuki, Kanagawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 91 days.

(21) Appl. No.: 17/254,360

(22) PCT Filed: Jun. 29, 2018

(86) PCT No.: PCT/CN2018/093604
§ 371 (c)(1),
(2) Date: Dec. 21, 2020

(87) PCT Pub. No.: WO2020/000356
PCT Pub. Date: Jan. 2, 2020

(65) Prior Publication Data
US 2021/0274557 A1    Sep. 2, 2021

(51) Int. Cl.
*H04W 74/00*    (2009.01)
*H04W 74/08*    (2009.01)
*H04W 72/04*    (2009.01)

(52) U.S. Cl.
CPC ..... *H04W 74/0833* (2013.01); *H04W 72/042* (2013.01); *H04W 72/0453* (2013.01); *H04W 74/008* (2013.01)

(58) Field of Classification Search
CPC .......... H04W 72/042; H04W 72/0453; H04W 74/006; H04W 74/008; H04W 74/0833
(Continued)

(56) References Cited

U.S. PATENT DOCUMENTS

| 8,886,238 B2* | 11/2014 | Chun | .............. H04L 5/0007 |
| | | | 375/150 |
| 2015/0163771 A1* | 6/2015 | Kim | .............. H04L 5/0053 |
| | | | 370/329 |

(Continued)

FOREIGN PATENT DOCUMENTS

WO    WO 2017195626 A1    11/2017

OTHER PUBLICATIONS

3GPP TS 36.213 V15.1.0, "3rd Generation Partnership Project; Technical Specification Group Radio Access Network; Evolved Universal Terrestrial Radio Access (E-UTRA); Physical layer procedures (Release 15)," Mar. 2018, 499 pages.

(Continued)

*Primary Examiner* — Robert J Lopata
(74) *Attorney, Agent, or Firm* — Seed IP Law Group LLP

(57) ABSTRACT

In a terminal (200), a radio transmitter (209) transmits a signal, and a controller (204) determines an allocation resource to which a signal is assigned in a predetermined frequency band. The predetermined frequency band herein is divided into a plurality of bands, and each of the plurality of bands includes a plurality of frequency resources which are base units of resource allocation for the signal. Furthermore, the allocation resource to which the signal is assigned is composed of at least one of the base units of each of the plurality of bands. Furthermore, a configuration method of the at least one of the base units forming the allocation resource is different for each of the plurality of bands.

13 Claims, 18 Drawing Sheets

(58) Field of Classification Search
USPC .......................................................... 370/329
See application file for complete search history.

(56) References Cited

U.S. PATENT DOCUMENTS

| 2019/0268907 | A1* | 8/2019 | Bhattad | ............. | H04W 72/0453 |
| 2020/0337072 | A1* | 10/2020 | Lunttila | ................ | H04L 5/0055 |
| 2020/0344099 | A1* | 10/2020 | Sahin | .................. | H04L 27/2607 |
| 2021/0176023 | A1* | 6/2021 | Nilsson | ................ | H04L 5/0007 |
| 2021/0289488 | A1* | 9/2021 | Cheng | .................. | H04L 5/0048 |

OTHER PUBLICATIONS

3GPP TS 38.211 V15.1.0, "3rd Generation Partnership Project; Technical Specification Group Radio Access Network; NR; Physical channels and modulation (Release 15)," Mar. 2018, 90 pages.
3GPP TS 38.331 V15.1.0, "3rd Generation Partnership Project; Technical Specification Group Radio Access Network; NR; Radio Resource Control (RRC) protocol specification (Release 15)," Mar. 2018, 280 pages.
International Search Reported, dated Mar. 28, 2019, for corresponding International Application No. PCT/CN2018/093604, 2 pages.
InterDigital Inc., "On UL Physical Layer Channel Design for NR-U," R1-1804869, Agenda Item: 7.6.3, 3GPP TSG RAN WG1 Meeting #92b, Sanya, China, Apr. 16-20, 2018, 21 pages.
MediaTek Inc., "On physical layer channel design for NR-U operation," R1-1804064, Agenda Item: 7.6.3, 3GPP TSG RAN WG1 Meeting #92bis, Sanya, China, Apr. 16-20, 2018, 4 pages.

\* cited by examiner

| Cluster Block No. | Interlace No. |
|---|---|
| 0 | 0 |
| 1 | 1 |
| 2 | 0 |
| 3 | 1 |
| 4 | 0 |
| 5 | 1 |
| 6 | 0 |
| 7 | 1 |
| 8 | 0 |
| 9 | 1 |

| Cluster Block No. | Interlace No. |
|---|---|
| 0 | 0 |
| 1 | 1 |
| 2 | 0 |
| 3 | 1 |
| 4 | 0 |
| 5 | 1 |
| 6 | 0 |
| 7 | 1 |
| 8 | 0 |
| 9 | 1 |

FIG. 14

| Cluster Block No. | Interlace No. |
|---|---|
| 0 | 0 |
| 1 | 3 |
| 2 | 5 |
| 3 | 2 |
| 4 | 0 |
| 5 | 3 |
| 6 | 6 |
| 7 | 1 |
| 8 | 2 |
| 9 | 0 |

FIG. 15

| PRACH Configuration Index | Preamble format | $n_{SFN}$ mod x =y | | Subframe number | Starting symbol | Number of PRACH slots within a subframe | $N_t^{RA,slot}$, number of time-domain PRACH occasions within a PRACH slot | $N_{dur}^{RA}$, PRACH Duration |
|---|---|---|---|---|---|---|---|---|
| | | x | y | | | | | |
| 0 | 0 | 16 | 1 | 1 | 0 | - | - | 0 |
| 1 | 0 | 16 | 1 | 4 | 0 | - | - | 0 |
| 2 | 0 | 16 | 1 | 7 | 0 | - | - | 0 |
| 3 | 0 | 16 | 1 | 9 | 0 | - | - | 0 |
| 4 | 0 | 8 | 1 | 1 | 0 | - | - | 0 |
| ⋮ | ⋮ | ⋮ | ⋮ | ⋮ | ⋮ | ⋮ | ⋮ | ⋮ |
| 87 | A1 | 16 | 0 | 4, 9 | 0 | 1 | 6 | 2 |
| 88 | A1 | 16 | 1 | 4 | 0 | 2 | 6 | 2 |
| 89 | A1 | 8 | 0 | 4, 9 | 0 | 1 | 6 | 2 |
| 90 | A1 | 8 | 1 | 4 | 0 | 2 | 6 | 2 |

| Cluster Block No. | Interlace No. (subframe#4) | Interlace No. (subframe#9) |
|---|---|---|
| 0 | 0 | 0 |
| 1 | 1 | 3 |
| 2 | 0 | 0 |
| 3 | 1 | 3 |
| 4 | 0 | 0 |
| 5 | 1 | 3 |
| 6 | 0 | 0 |
| 7 | 1 | 3 |
| 8 | 0 | 0 |
| 9 | 1 | 3 |

FIG. 21

| Cluster Block No. | Interlace No. | | | |
|---|---|---|---|---|
| | PRACH FDM Resource#1 | PRACH FDM Resource#2 | PRACH FDM Resource#3 | PRACH FDM Resource#4 |
| 0 | 0, 5 | 1, 6 | 2, 7 | 3, 8 |
| 1 | 1, 6 | 2, 7 | 3, 8 | 4, 9 |
| 2 | 0, 5 | 1, 6 | 2, 7 | 3, 8 |
| 3 | 1, 6 | 2, 7 | 3, 8 | 4, 9 |
| ⋮ | ⋮ | ⋮ | ⋮ | ⋮ |
| N | 1, 6 | 2, 7 | 3, 8 | 4, 9 |

FIG. 22

| Cluster Block No. | Interlace No. | | | |
|---|---|---|---|---|
| | PRACH FDM Resource#1 | PRACH FDM Resource#2 | PRACH FDM Resource#3 | PRACH FDM Resource#4 |
| 0 | 0 | 1 | 2 | 3 |
| 1 | 1 | 2 | 3 | 0 |
| 2 | 0 | 1 | 2 | 3 |
| 3 | 1 | 2 | 3 | 0 |
| ⋮ | ⋮ | ⋮ | ⋮ | ⋮ |
| 8 | 0 | 1 | 2 | 3 |
| 9 | — | — | — | — |

FIG. 23

| Cluster Block No. | Interlace No. | | | |
|---|---|---|---|---|
| | PRACH FDM Resource#1 | PRACH FDM Resource#2 | PRACH FDM Resource#3 | PRACH FDM Resource#4 |
| 0 | 0 | 1 | 2 | 3 |
| 1 | 1 | 2 | 3 | 0 |
| 2 | 0 | 1 | 2 | 3 |
| 3 | 1 | 2 | 3 | 0 |
| ⋮ | ⋮ | ⋮ | ⋮ | ⋮ |
| N | 1 | 2 | 3 | 0 |

SCS:30kHz

SCS:15kHz

FIG. 24

TRANSMISSION APPARATUS, RECEPTION APPARATUS, TRANSMISSION METHOD, AND RECEPTION METHOD

TECHNICAL FIELD

The present disclosure relates to a transmission apparatus, a reception apparatus, a transmission method, and a reception method.

BACKGROUND ART

In the standardization of 5G, a new radio access technology (NR: New Radio) not necessarily having backward compatibility with Long Term Evolution (LTE)/LTE-Advanced has been discussed in the 3rd generation partnership project (3GPP).

In NR, as with LTE-License-Assisted Access (LAA), an operation in unlicensed bands is expected. In addition, in order to implement NR Stand-alone (operable by NR alone) in unlicensed bands, introducing the physical random access channel (PRACH), which has not been introduced into LTE-LAA, into unlicensed bands has been discussed (see, e.g., Non-Patent Literature (hereinafter, referred to as "NPL") 1).

CITATION LIST

Non-Patent Literature

NPL 1
InterDigital, R1-1804869, "On UL Physical Layer Channel Design for NR-U," 3GPP TSG-RAN WG1 Meeting #92b, April 2018
NPL 2
MediaTek, R1-1804064, "On physical layer channel design for NR-U operation," 3GPP TSG-RAN WG1 Meeting #92b
NPL 3
3GPP TS 36.213 V15.1.0, "Physical layer procedures (Release 15)," 2018-03
NPL 4
3GPP TS 38.331 V15.1.0, "NR; Radio Resource Control (RRC) protocol specification (Release 15)," 2018-03

SUMMARY

There has been no sufficient discussion on transmission methods for signals in unlicensed bands, however.

One non-limiting and exemplary embodiment facilitates providing a transmission apparatus, a reception apparatus, a transmission method, and a reception method each enabling appropriately transmitting a signal in an unlicensed band.

In one general aspect, a transmission apparatus according to the present disclosure includes: a transmission circuit, which in operation, transmits a signal; and a control circuit, which in operation, determines an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

In another general aspect, a reception apparatus according to the present disclosure includes: a reception circuit, which in operation, receives a signal; and a control circuit, which in operation, determines an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

In still another general aspect, a transmission method according to the present disclosure includes: transmitting a signal; and determining an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

In still another general aspect, a reception method according to the present disclosure includes: receiving a signal; and determining an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

It should be noted that general or specific embodiments may be implemented as a system, an apparatus, a method, an integrated circuit, a computer program or a storage medium, or any selective combination of the system, the apparatus, the method, the integrated circuit, the computer program, and the storage medium.

According to an aspect of this disclosure, a signal can be appropriately transmitted in an unlicensed band.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 14 is a diagram illustrating exemplary interlace numbers for respective cluster blocks according to Configuration Example 1 of Calculation Example 1 of Embodiment 1;

FIG. 15 is a diagram illustrating exemplary interlace numbers for respective cluster blocks according to Configuration Example 2 of Calculation Example 1 of Embodiment 1;

FIG. 21 is a diagram illustrating exemplary interlace numbers for each cluster block according to Embodiment 2;

FIG. 22 is a diagram illustrating an example of a cluster block-interlace mapping table according to another embodiment;

FIG. 23 is a diagram illustrating an example of a cluster block-interlace mapping table according to still another embodiment; and FIG. 24 is a diagram illustrating an example of a cluster block-interlace mapping table according to yet another embodiment.

DESCRIPTION OF EMBODIMENTS

Hereinafter, a detailed description will be given of embodiments of the present disclosure with reference to the accompanying drawings.

[PRACH]

Figure 1:
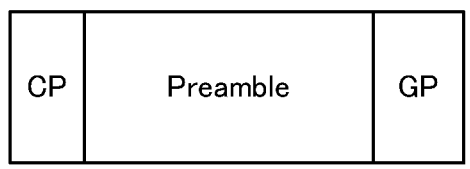
FIG. 1 is a diagram illustrating a configuration example of PRACH.

As illustrated in FIG. 1, PRACH is composed of a cyclic prefix (CP), a preamble, and a guard period (GP). Preamble is generated from a code sequence, such as a Zadoff-Chu sequence, for example. Moreover, CP is a signal obtained by duplicating part of a preamble. GP is a non-transmission interval. PRACH is used in a base station (may be referred to as "gNB") for uplink transmission timing control of a terminal (hereinafter, may be referred to as "User Equipment (UE)"). The base station, for example, detects a received signal from PRACH and controls uplink transmission timing of the terminal such that the received signal (including a delay wave) can fit into the CP.

[B-IFDMA]

As one PRACH transmission method in an unlicensed band, the block-interleaved frequency division multiple access (B-IFDMA), which has been introduced as a physical uplink shared channel (PUSCH) transmission method in LTE-LAA, has been under study (see, e.g., NPL 1).

B-IFDMA is a method that transmits a signal using bands called interlaces which are uniformly distributed in a frequency direction within a system band, in order to comply with regulation of the occupied channel bandwidth (OCB) of unlicensed bands and mitigate the impact of power spectral density (PSD) limit.

Interlaces are each composed of contiguous subcarriers (block of contiguous frequency resources). Interlaces are each a base unit of resource allocation for a signal in an unlicensed band. A plurality of interlaces are included within each band resulting from division of a system band into a plurality of blocks (hereinafter, each band is referred to as "cluster block"), for example. Each of the interlaces included in each cluster block is assigned a number (hereinafter, referred to as "interlace number").

Note that, the term "cluster block" has meaning similar to an "interval" in which an interlace of the same interlace number is mapped. More specifically, the interlaces of the same interlace number are uniformly distributed in the frequency direction over a plurality of cluster blocks.

Furthermore, a cluster block may be defined not only as each band resulting from division of a system band into a plurality of blocks, but also as each band resulting from division of a predetermined band (e.g., such as a band where the listen before talk (LBT) is performed or a 20 MHz band or a band of an integral multiple of 20 MHz) into a plurality of blocks.

Figure 2:
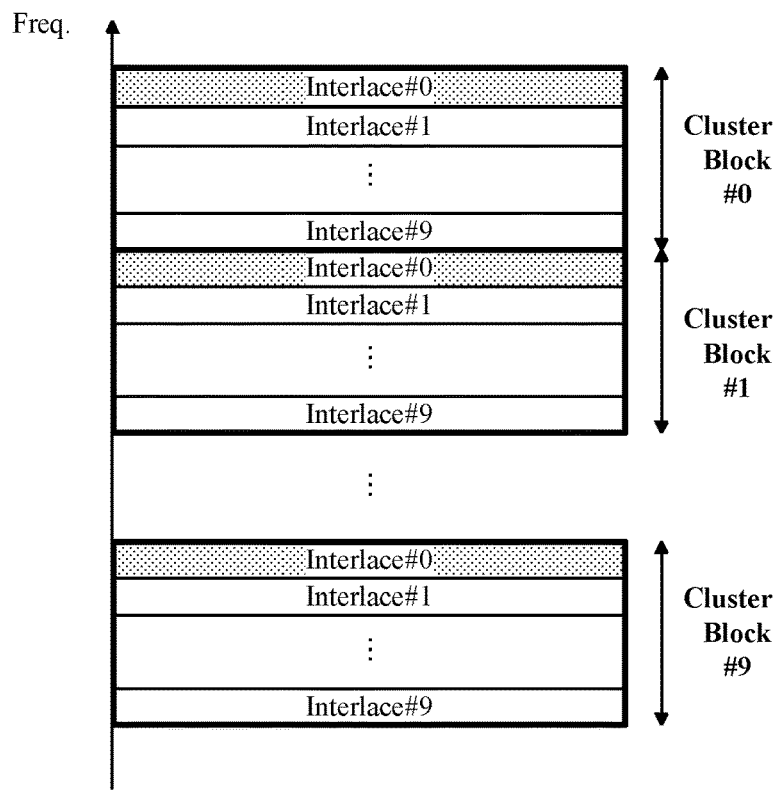
FIG. 2 is a diagram illustrating an example of resource allocation in B-IFDMA.

In LTE-LAA in which the system bandwidth is 20 MHz (100 physical resource blocks (PRBs)), for example, the bandwidth per interlace is 1 PRB (12 subcarriers). As illustrated in FIG. 2, for example, a signal (e.g., PUSCH) is transmitted using 10 interlaces mapped with an interval of 10 PRBs (see, e.g., NPL 3).

In FIG. 2, for example, 10 interlaces in each cluster block are assigned interlace numbers, namely, interlace #0, #1, . . . , #9. Moreover, in FIG. 2, the cluster blocks are assigned cluster block numbers, namely, cluster block #0, #1, . . . , #9. In case of FIG. 2, the interlaces of the same interlace number are uniformly distributed in the frequency direction for 10 PRBs each (in other words, for respective cluster blocks). In a case where PUSCH is transmitted using the interlaces of one interlace number (interlace number #0 in FIG. 2), for example, PRB indices (or referred to as "PRB numbers") to which PUSCH is assigned are as follows (0, 10, 20, . . . , 90).

Figure 3:
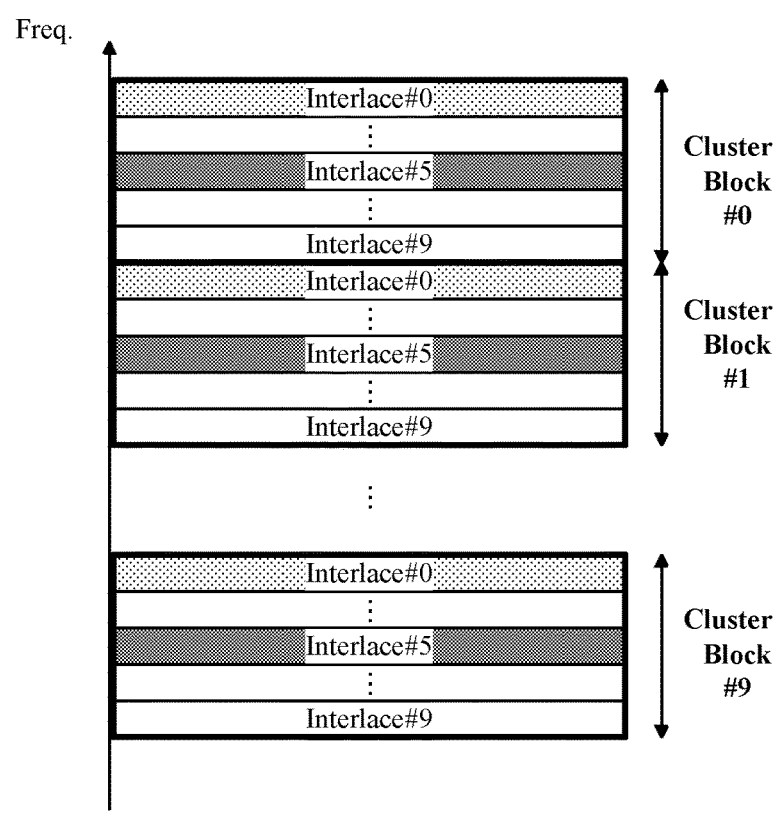
FIG. 3 is a diagram illustrating another example of resource allocation in B-IFDMA.

Moreover, PUSCH of LTE-LAA can be transmitted using a plurality of interlaces (frequency resources) in each cluster block. FIG. 3 illustrates exemplary resource allocation of a case where PUSCH is transmitted using two interlaces (e.g., interlace #0, #5) in each cluster block, for example.

As described above, in LTE-LAA, the interlace numbers used for PUSCH transmission are the same in each cluster block. Stated differently, the frequency intervals for mapping the interlaces (of the same interlace number) used for PUSCH transmission in each cluster block are the same. In the example of FIG. 2 or FIG. 3, the interlaces of the same interlace number are mapped with each frequency interval (10 interlaces or 10 PRBs) corresponding to the cluster block, for example.

[PRACH Transmission Using B-IFDMA]

In a case where PRACH is transmitted using B-IFDMA, the autocorrelation properties of PRACH degrade, which in turn, causes a problem in that the estimation accuracy of uplink transmission timing degrades (see, e.g., NPL 2).

Figure 4:
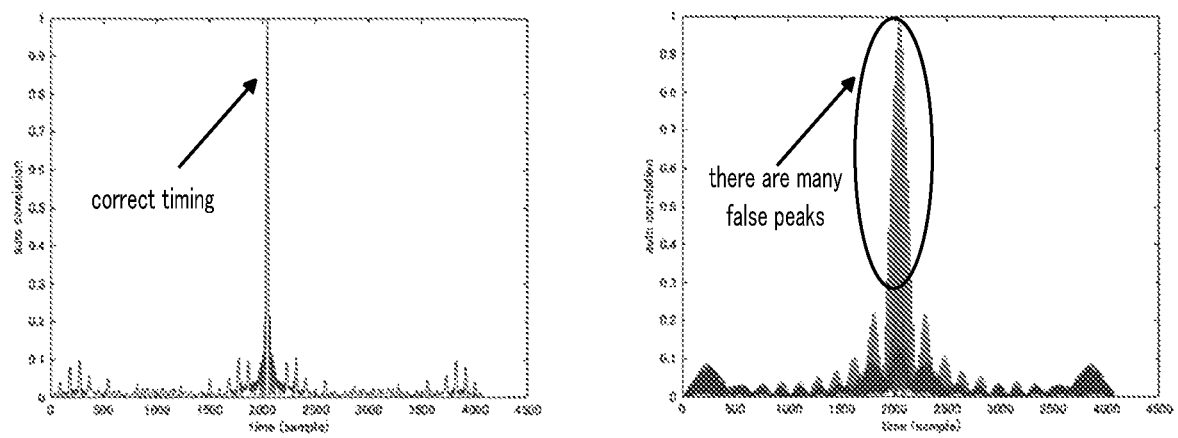
FIG. 4 is a diagram illustrating exemplary autocorrelation properties of PRACH.

As an example, FIG. 4 illustrates the autocorrelation properties of a case where the system bandwidth is set to 20 MHz (FFT size=2048) and a Zadoff-Chu sequence having a sequence length 113 is used as a preamble of PRACH, and the preamble is assigned to a continuous band as in LTE (left side of FIG. 4), and FIG. 4 also illustrates the autocorrelation properties of a case where a preamble is assigned to a band using B-IFDMA (right side of FIG. 4). As illustrated in FIG. 4, it can be seen that there occur many peaks (side lobes) at positions other than a correct timing position in autocorrelation properties in the case where a preamble is transmitted using B-IFDMA. One sample of the horizontal axis of FIG. 4 is equivalent to 32.55 [ns], for example, so that a side lobe has a width of approximately several μs.

Accordingly, in a case where a terminal transmits PRACH, using B-IFDMA, the estimation accuracy of uplink transmission timing in a base station adversely degrades. In a case where the estimation accuracy of uplink transmission timing degrades, the base station cannot control the uplink transmission timing of the terminal in a normal way, so that uplink reception performance adversely degrades.

In this respect, a description will be given hereinafter of a PRACH transmission method that prevents degradation of the estimation accuracy of uplink transmission timing in a base station and that improves the uplink reception performance in the base station in a case where a terminal transmits PRACH.

In LTE-LAA, the interlace numbers in each cluster block used for signal transmission are the same (see, e.g., FIG. 2 or FIG. 3). Meanwhile, in an aspect of the present disclosure, at least one of the interlace numbers in each cluster block used for PRACH transmission is different. Stated differently, in an aspect of the present disclosure, a configuration method of interlaces (blocks of contiguous frequency resources) forming an allocation resource to which PRACH is assigned (hereinafter, may be referred to as "PRACH resource") is different for each band resulting from division of a system band into a plurality of blocks (e.g., cluster blocks).

The inventors of the present disclosure have found by computer simulation that the estimation accuracy of uplink transmission timing described above can be improved by changing an interlace (in other words, interlace number) to which a PRACH resource is allocated to another for each cluster block in a case where PRACH is transmitted using an interlace in a cluster block as in B-IFDMA.

Hereinafter, a description will be given of, as an example of a method of changing an interlace number for each cluster block, an exemplary case where a different interlace number is used between odd number cluster blocks and even number cluster blocks (hereinafter, referred to as "case 1 mapping") and an exemplary case where an interlace number for each cluster block is configured using a random number (hereinafter, referred to as "case 2 mapping").

Note that, as an example, each cluster block includes 10 interlaces and these interlaces are respectively assigned interlace numbers, namely, interlace #0, #1, . . . , #9 (see, FIG. 5 and FIG. 7 to be described, hereinafter) in the following description. Moreover, the cluster blocks are respectively assigned cluster block numbers, namely, cluster block #0, #1, . . . , #9 (see, FIG. 5 and FIG. 7 to be described, hereinafter).

Figure 5:
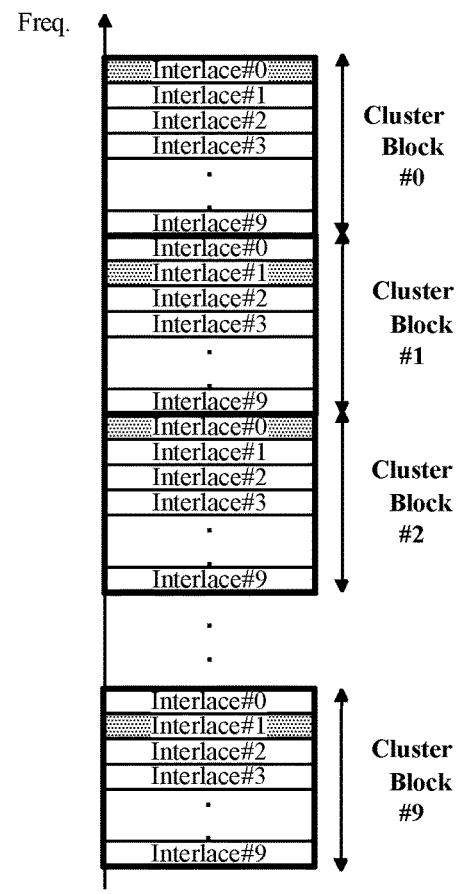
FIG. 5 is a diagram illustrating an example of a cluster block-interlace mapping table and resource allocation in case 1 mapping.

FIG. 5 is a diagram illustrating an exemplary table indicating interlace numbers for respective cluster blocks in case 1 mapping (hereinafter, referred to as "cluster block-interlace mapping table"), and illustrating a resource mapping example of a case where this cluster block-interlace mapping table is used.

In FIG. 5, for a signal (e.g., PRACH), even number cluster blocks are assigned interlace #0 and odd number cluster blocks are assigned interlace #1. As illustrated in FIG. 5, the interlace number used for one PRACH transmission is different between even number cluster blocks and odd number cluster blocks. Stated differently, in FIG. 5, a frequency resource position to which PRACH is assigned in each cluster block differs between even number cluster blocks and odd number cluster blocks.

Figure 6:
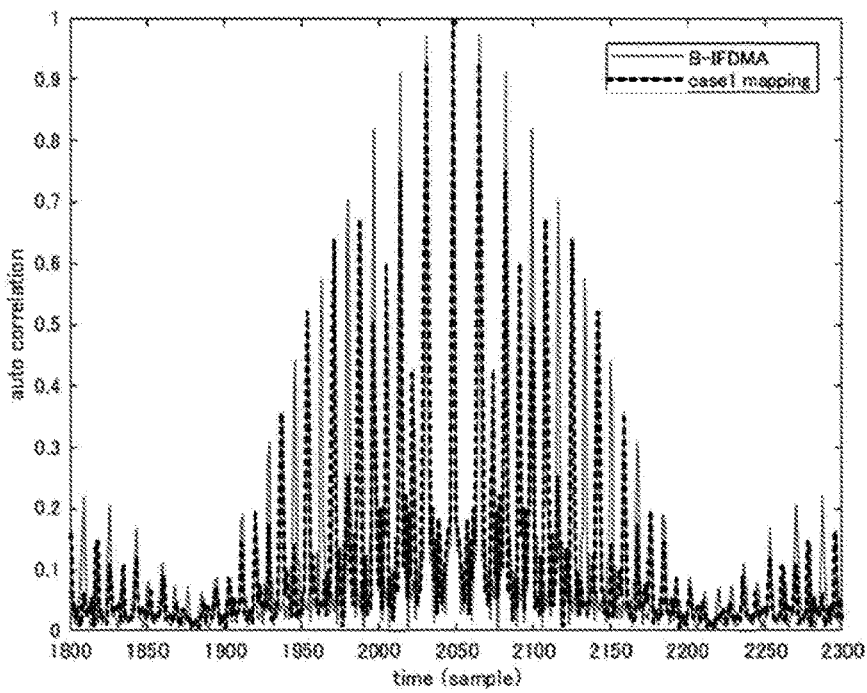
FIG. 6 is a diagram illustrating a comparison example of autocorrelation properties between B-IFDMA and case 1 mapping.

FIG. 6 illustrates autocorrelation properties (indicated by solid lines) in PRACH transmission, using B-IFDMA (see, e.g., FIG. 2) and autocorrelation properties (indicated by dotted lines) in PRACH transmission, using case 1 mapping (see, e.g., FIG. 5). As illustrated in FIG. 6, it can be seen that the power of side lobes decreases in the autocorrelation properties when case 1 mapping is used (mapping to the resources illustrated in FIG. 5) as compared with the case where B-IFDMA is used. Accordingly, it is considered that the estimation accuracy of uplink transmission timing in the base station is improved by using case 1 mapping.

Moreover, as to cubic matric (CM) properties having impact on the performance of a power amplifier, CM is 1.72 dB when B-IFDMA is used, whereas CM is 1.88 dB when case 1 mapping is used. Thus, there is no difference in CM properties between B-IFDMA and case 1 mapping.

Figure 7:
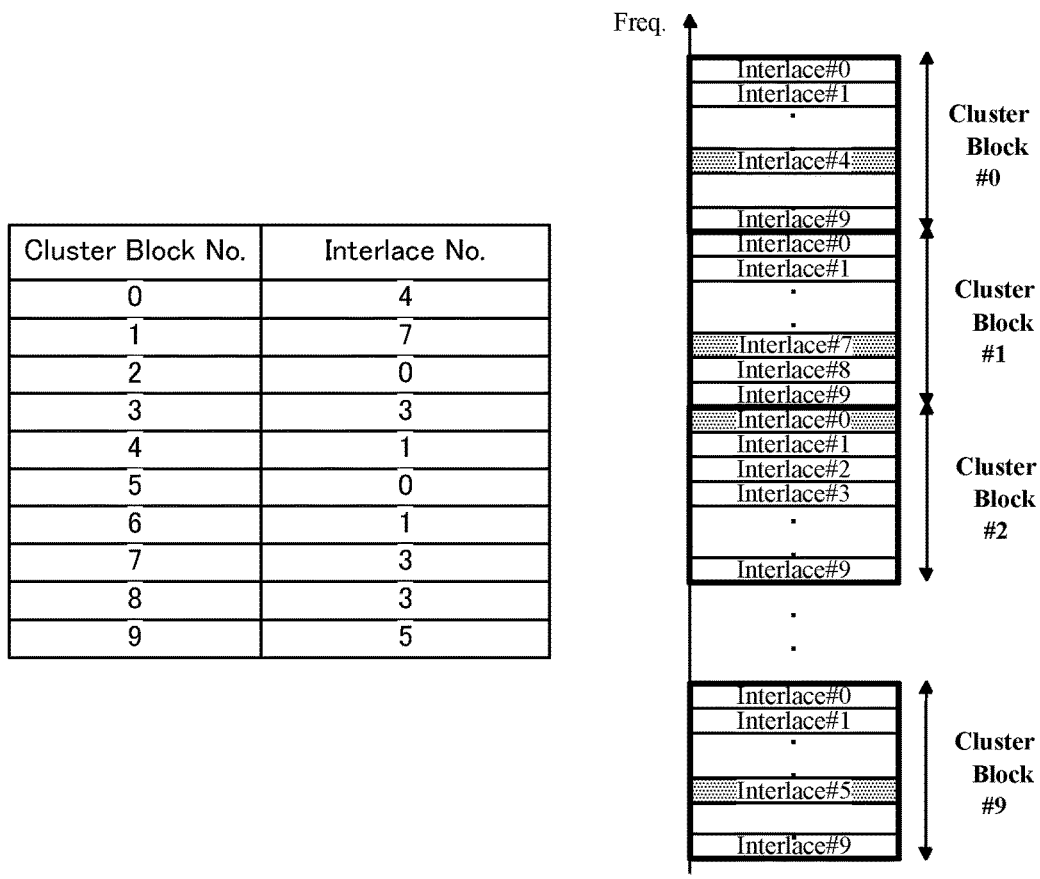
FIG. 7 is a diagram illustrating an example of a cluster block-interlace mapping table and resource allocation in case 2 mapping.

Next, FIG. 7 is a diagram illustrating an exemplary cluster block-interlace mapping table in case 2 mapping, and illustrating a resource mapping example of a case where this cluster block-interlace mapping table is used.

In FIG. 7, a signal (e.g., PRACH) is assigned an interlace number, using a random number for each cluster block. As illustrated in FIG. 7, the interlace number used for transmission of one PRACH becomes a random number in each cluster block (any one of 0, 1, 3, 4, 5, or 7) in FIG. 7. Stated differently, in FIG. 7, a frequency resource position to which PRACH is assigned in each cluster block is randomly configured, and there is a high possibility that the frequency resource positions will be different in the respective cluster block.

Figure 8:
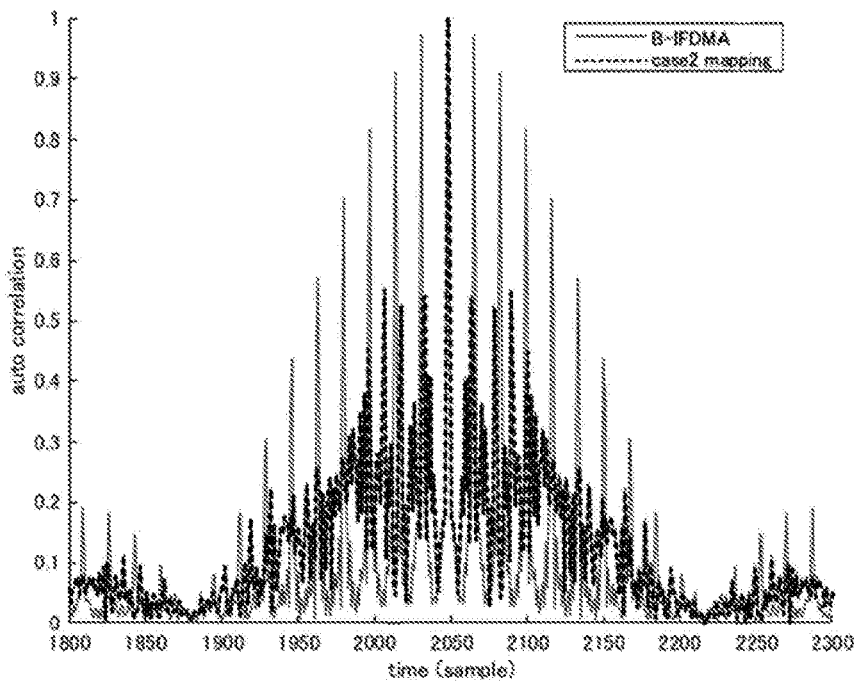
FIG. 8 is a diagram illustrating a comparison example of autocorrelation properties between B-IFDMA and case 2 mapping.

FIG. 8 illustrates autocorrelation properties (indicated by solid lines) in PRACH transmission, using B-IFDMA (see, e.g., FIG. 2), and autocorrelation properties (indicated by dotted lines) in PRACH transmission, using case 2 mapping (see, e.g., FIG. 7). As illustrated in FIG. 8, it can be seen that the power of side lobes decreases in autocorrelation properties when case 2 mapping is used (mapping to the resources illustrated in FIG. 7) as compared with the case where B-IFDMA is used. In addition, as illustrated in FIG. 8, it can be seen that the power reduction amount of side lobes in autocorrelation properties when case 2 mapping is used is large as compared with the case where case 1 mapping is used (see, e.g., FIG. 6). Accordingly, it is considered that the estimation accuracy of uplink transmission timing in the base station is improved by using case 2 mapping as compared with B-IFDMA and case 1 mapping.

In addition, as to cubic matric (CM) properties, CM is 1.72 dB when B-IFDMA is used, whereas CM is 2.80 dB when case 2 mapping is used. Thus, the CM increases when case 2 mapping is used. As the CM increases, the power consumption amount used for signal transmission increases, so that the battery life of the terminal adversely decreases.

As described above, as with case 1 mapping illustrated in FIG. 5 or as with case 2 mapping illustrated in FIG. 7, by changing the interlace number to be assigned to a signal, for each cluster block, the estimation accuracy of uplink transmission timing can be improved as compared with a case where B-IFDMA is used.

Note that, the method of changing an interlace number of each cluster block is not limited to case 1 mapping and case 2 mapping. As long as a pattern using an interlace number configured for each cluster block (in other words, pattern including a different interlace number) is used, the estimation accuracy of uplink transmission timing can be improved with any pattern as compared with B-IFDMA.

Furthermore, as illustrated in FIG. 6 and FIG. 8, as the randomness of the interlace number to be configured for each cluster block becomes higher, the power reduction amount of side lobes in autocorrelation properties becomes larger but the CM also becomes higher. Stated differently, with the method of changing an interlace number for each cluster block, the power reduction effect of side lobes and the CM properties are in a trade-off relationship.

Moreover, for PRACH in NR (e.g., may be referred to as "NR PRACH"), a plurality of resources (hereinafter, may be referred to as "PRACH resource") can be configured in a frequency domain. The number of PRACH FDM resources to be frequency multiplexed in one time unit can be changed from among 1, 2, 4, and 8, using higher layer signaling (e.g., control signal called msg1-FDM), for example (e.g., see NPL 4).

Embodiment 1

[Summary of Communication System]

A communication system according to an embodiment of the present disclosure includes base station 100 and terminal 200. In the following description, as an example, terminal 200 (corresponding to a transmission apparatus) transmits PRACH and base station 100 (corresponding to a reception apparatus) receives PRACH.

Figure 9:
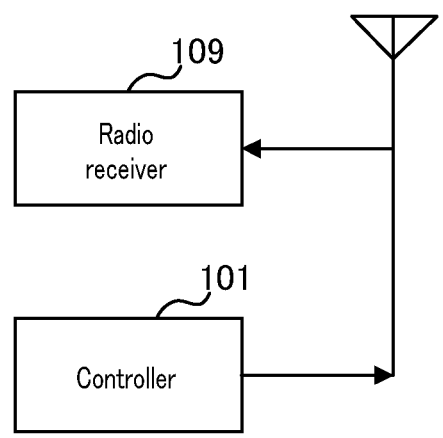
FIG. 9 is a block diagram illustrating a configuration of part of a base station according to Embodiment 1.

FIG. 9 is a block diagram illustrating part of a configuration of base station 100 according to the embodiment of the present disclosure. In base station 100 illustrated in FIG. 9, radio receiver 109 receives a signal (e.g., PRACH), and controller 101 determines an allocation resource to which a signal is assigned (e.g., PRACH resource) in a predetermined frequency band.

Figure 10:
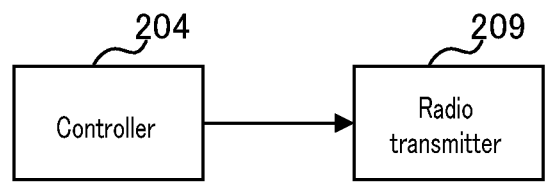
FIG. 10 is a block diagram illustrating a configuration of part of a terminal according to Embodiment 1.

FIG. 10 is a block diagram illustrating part of a configuration of terminal 200 according to the embodiment of the present disclosure. In terminal 200 illustrated in FIG. 10, radio transmitter 209 transmits a signal (e.g., PRACH), and controller 204 determines an allocation resource to which a signal is assigned (e.g., PRACH resource) in a predetermined frequency band.

Note that, the predetermined frequency band is divided into a plurality of bands (e.g. cluster blocks), and each of the plurality of bands includes a plurality of frequency resources (e.g., interlaces) which are base units of resource allocation for a signal. Moreover, an allocation resource to which a signal is assigned is composed of at least one base unit of each of the plurality of bands. Moreover, a configuration method of base units forming the allocation resource is different for each of the plurality of bands.

[Configuration of Base Station]

Figure 11:
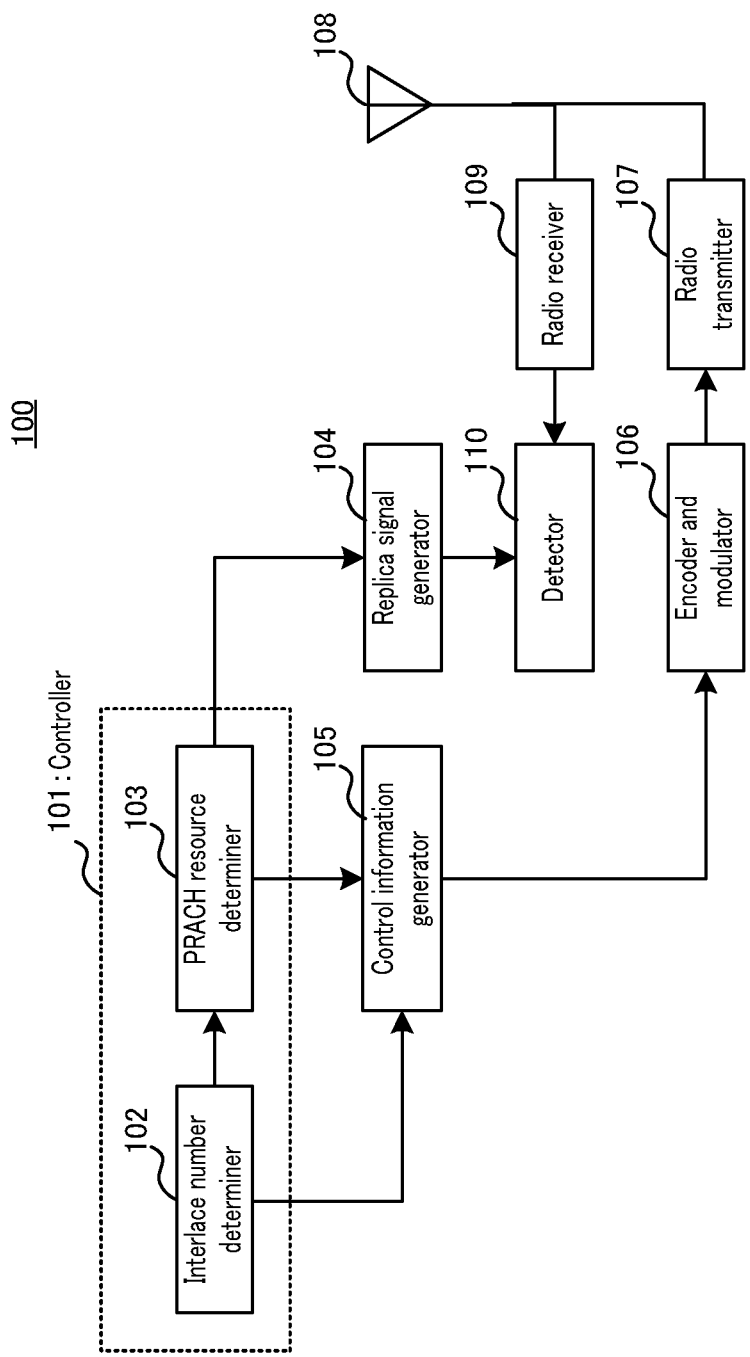
FIG. 11 is a block diagram illustrating the configuration of the base station according to Embodiment 1.

FIG. 11 is a block diagram illustrating a configuration of base station 100 according to the present embodiment.

In FIG. 11, base station 100 includes controller 101, replica signal generator 104, control information generator 105, encoder and modulator 106, radio transmitter 107, antenna 108, radio receiver 109, and detector 110.

Controller 101 (e.g., scheduler) allocates a resource in uplink transmission for terminal 200, for example. Controller 101 determines an allocation resource to be used for PRACH transmission (e.g., PRACH FDM resource), for example. Controller 101 includes interlace number determiner 102 and PRACH resource determiner 103.

Interlace number determiner 102 determines, for each cluster block, an interlace number to which PRACH is assigned. Interlace number determiner 102 outputs information indicating the determined interlace number for each cluster block to PRACH resource determiner 103 and control information generator 105. When indicating a parameter used for determining the interlace number for each cluster block to terminal 200, interlace number determiner 102 outputs the information indicating the parameter to control information generator 105. Note that, the details of a determination method of an interlace number for each cluster block in interlace number determiner 102 will be provided, hereinafter.

PRACH resource determiner 103 determines an interlace number for each PRACH FDM resource based on the interlace number for each cluster block, which is inputted from interlace number determiner 102. PRACH resource determiner 103 outputs information indicating the determined interlace number for each PRACH FDM resource to replica signal generator 104 and control information generator 105. Moreover, when indicating a parameter used for determining the interlace number for each PRACH FDM resource to terminal 200, PRACH resource determiner 103 outputs information indicating the parameter to control information generator 105. Note that, the details of a determination method of an interlace number for each PRACH FDM resource in PRACH resource determiner 103 will be provided, hereinafter.

Replica signal generator 104 generates a replica signal for detecting a PRACH preamble, based on the information to be inputted from PRACH resource determiner 103 and outputs the generated replica signal to detector 110.

Control information generator 105 generates control information based on the information to be inputted from interlace number determiner 102 or PRACH resource determiner 103. Control information generator 105 outputs the generated control information to encoder and modulator 106.

Note that, the information to be inputted from interlace number determiner 102 and PRACH resource determiner 103 is not necessarily indicated to terminal 200 at the same time. Part of the control information generated by control information generator 105 may be indicated to terminal 200 as cell common information or indicated to terminal 200 as semi-static indication information, for example. Furthermore, part of the control information may be specified as system common information by specification and does not have to be indicated from base station 100 to terminal 200.

Encoder and modulator 106 modulates and encodes the control information inputted from control information generator 105 and outputs the encoded signal to radio transmitter 107.

Radio transmitter 107 applies transmission processing, such as D/A conversion, up-conversion, amplification and/or the like, to the signal inputted from encoder and modulator

106 and transmits a radio signal obtained by the transmission processing to terminal 200 via antenna 108.

Radio receiver 109 applies reception processing, such as down-conversion, A/D conversion and/or the like, to the signal received from terminal 200 via antenna 108, and outputs the signal obtained by the reception processing to detector 110.

Detector 110 performs correlation processing between the signal inputted from radio receiver 109 and the replica signal inputted from replica signal generator 104 and performs detection of a PRACH preamble and timing estimation. Note that, the correlation processing to be performed in detector 110 may be processing to calculate a delay profile to be used in timing estimation by performing correlation processing in a time domain or processing to calculate a delay profile by performing inverse fast Fourier transform (IFFT) after performing correlation processing (division processing) in a frequency domain.

[Configuration of Terminal]

Figure 12:
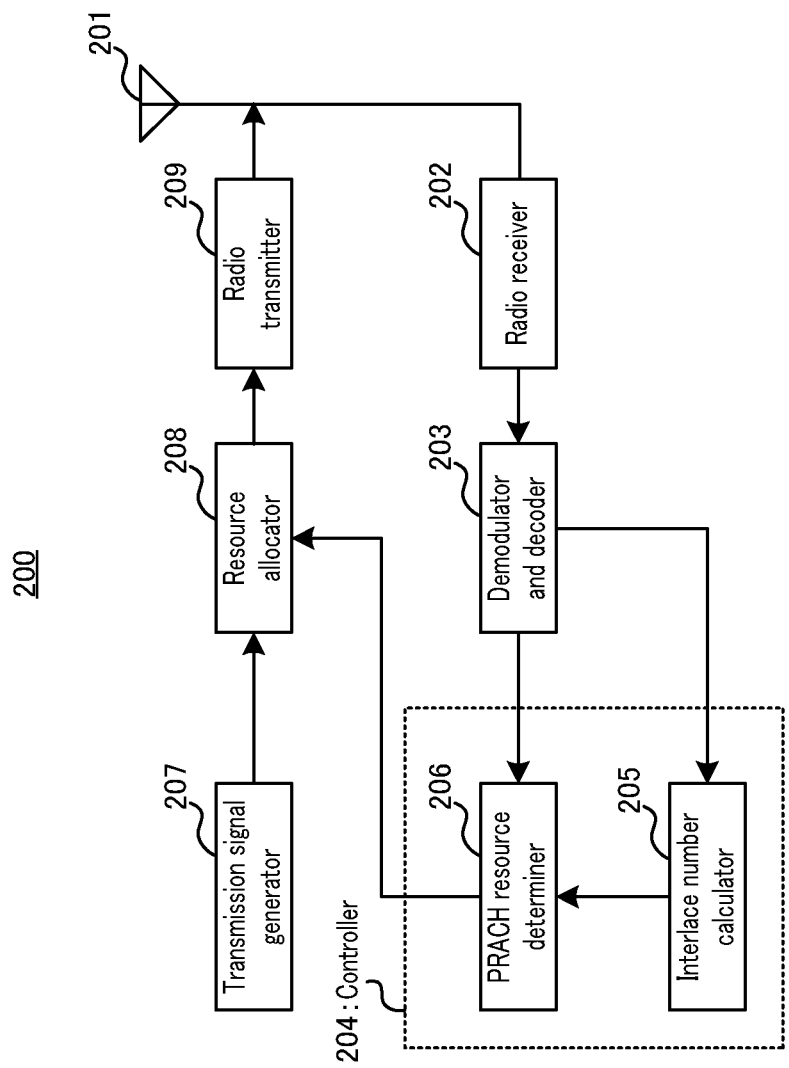
FIG. 12 is a block diagram illustrating the configuration of the terminal according to Embodiment 1.

FIG. 12 is a block diagram illustrating the configuration of terminal 200 according to the present embodiment.

In FIG. 12, terminal 200 includes antenna 201, radio receiver 202, demodulator and decoder 203, controller 204, transmission signal generator 207, resource allocator 208, and radio transmitter 209.

Radio receiver 202 applies reception processing, such as down-conversion, A/D conversion and/or the like, to the received signal received from base station 100 via antenna 201 and outputs the signal obtained by the reception processing to demodulator and decoder 203.

Demodulator and decoder 203 demodulates and decodes the received signal inputted from radio receiver 202 and extracts control information transmitted from base station 100, based on the decoding result. Demodulator and decoder 203 outputs the extracted control information to controller 204.

Controller 204 determines an allocation resource to which a transmission signal (e.g., PRACH) is assigned (e.g., PRACH FDM resource), based on the control information inputted from demodulator and decoder 203. Controller 204 includes interlace number calculator 205 and PRACH resource determiner 206, for example.

Interlace number calculator 205 calculates, for each cluster block, an interlace number to which PRACH is assigned, based on the control information inputted from demodulator and decoder 203. Interlace number calculator 205 outputs information indicating the interlace number for each cluster block obtained by the calculation to PRACH resource determiner 206. Note that, the details of a calculation method of an interlace number for each cluster block in interlace number calculator 205 will be provided, hereinafter.

An operation of PRACH resource determiner 206 is similar to an operation of PRACH resource determiner 103 of base station 100. PRACH resource determiner 206 determines an interlace number for each PRACH FDM resource based on the control information inputted from demodulator and decoder 203 and the information indicating interlace number for each cluster block which is inputted from interlace number calculator 205, for example. PRACH resource determiner 206 outputs the information indicating the determined interlace number for each PRACH FDM resource to resource allocator 208. Note that, the details of a determination method of an interlace number for each PRACH FDM resource in PRACH resource determiner 206 will be provided, hereinafter.

Transmission signal generator 207 generates a transmission signal (e.g., PRACH preamble of FIG. 1) and outputs the generated transmission signal to resource allocator 208. The transmission signal, for example, may be a code sequence generated by adding a cyclic shift and/or the like to a code sequence of a Zadoff-Chu sequence and/or the like. Furthermore, the PRACH preamble may be generated in a frequency domain or may be generated by conversion of a code sequence generated in a time domain into a code sequence of a frequency domain, using fast Fourier transform (FFT).

Resource allocator 208 assigns a transmission signal (e.g., code sequence) to be inputted from transmission signal generator 207 to a frequency resource, based on the information to be inputted from PRACH resource determiner 206 (e.g., interlace number for each PRACH FDM resource). Resource allocator 208 outputs a transmission signal after the resource allocation to radio transmitter 209.

Radio transmitter 209 applies transmission processing, such as D/A conversion and/or up-conversion, to the signal inputted from resource allocator 208 and transmits a radio signal obtained by the transmission processing to base station 100 via antenna 201.

[Operations of Base Station 100 and Terminal 200]

A detailed description will be given of operations of base station 100 and terminal 200 each configured in the manner described above.

Figure 13:
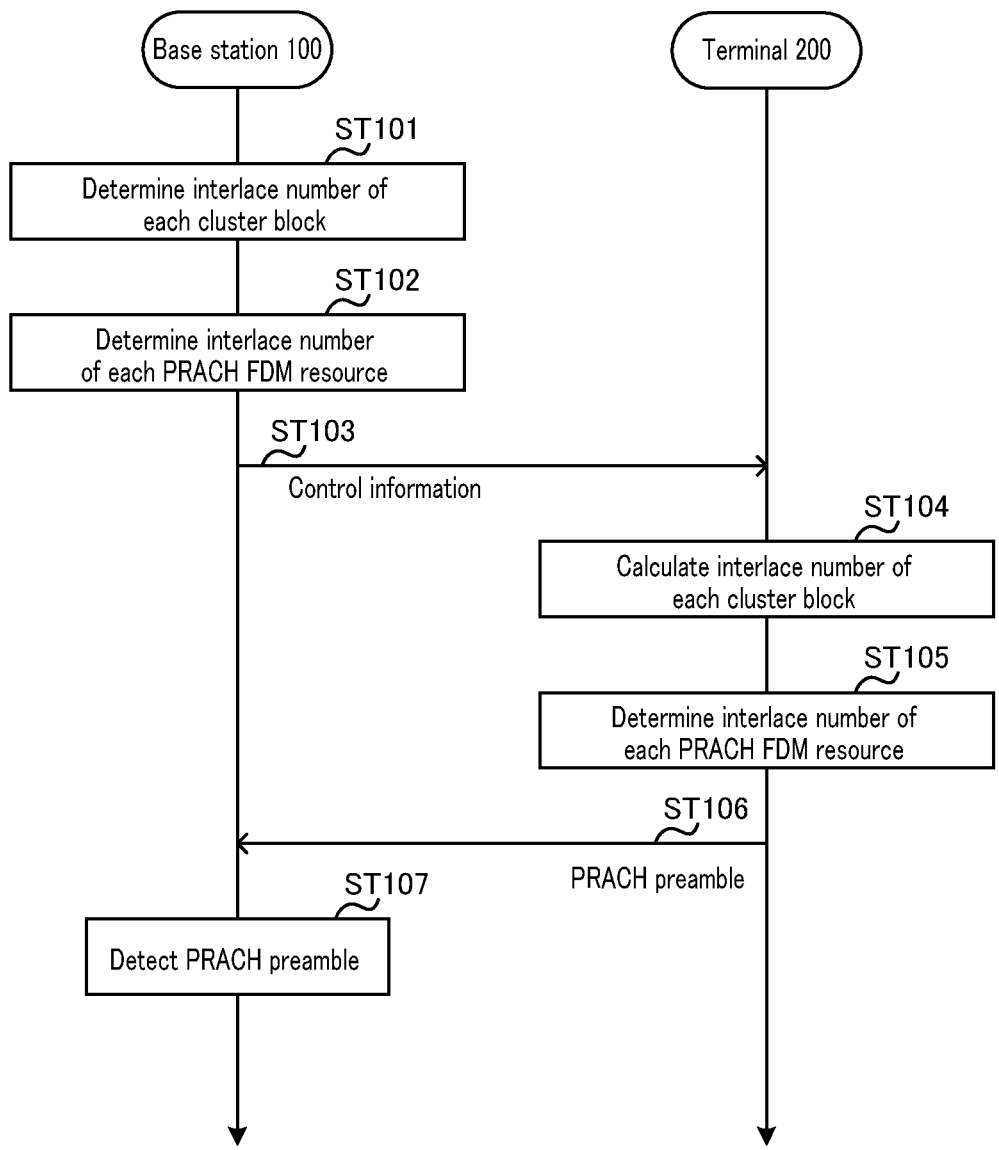
FIG. 13 is a sequence diagram illustrating an operation example of the base station and terminal according to Embodiment 1.

FIG. 13 is a sequence diagram illustrating the operations of base station 100 (FIG. 11) and terminal 200 (FIG. 12).

Base station 100 determines an interlace number of each cluster block (ST101). Base station 100 then determines an interlace number for each PRACH FDM resource in each cluster block, using the interlace number of each cluster block determined in ST101 (ST102). Base station 100 transmits, to terminal 200, control information for terminal 200 to calculate a PRACH FDM resource (ST103).

Terminal 200 calculates an interlace number of each cluster block, using the control information indicated by base station 100 (ST104). Terminal 200 then determines an interlace number of each PRACH FDM resource in each cluster block, using the interlace number of each cluster block determined in ST104 (ST105).

Terminal 200 then transmits a PRACH preamble to base station 100 based on the interlace number (i.e., PRACH resource) of each PRACH FDM resource in each cluster block determined in ST105 (ST106).

Base station 100 detects the PRACH preamble transmitted from terminal 200 and performs timing estimation, for example, using the detected PRACH preamble (ST107).

[Determination and Calculation Methods of Interlace Numbers]

Next, a detailed description will be given of a determination method of an interlace number in interlace number determiner 102 of base station 100 (e.g., processing of ST101 of FIG. 13) and a calculation method of an interlace number in interlace number calculator 205 of terminal 200 (e.g., processing of ST104 of FIG. 13).

Interlace number calculator 205 of terminal 200 calculates, for each cluster block, an interlace number based on the control information indicated by base station 100. Moreover, interlace number determiner 102 of base station 100 determines an interlace number based on resource allocation information determined in controller 101, instead of control information.

Note that, the control information from base station 100 to terminal 200 is not always necessary, and a method in which terminal 200 performs derivation, using system common information or a calculation formula specified by specification, may be employed.

In the following description, an operation of interlace number calculator 205 of terminal 200 will be mainly described. Interlace number determiner 102 of base station 100 may determine an interlace number, using a method similar to that of interlace number calculator 205.

Calculation Examples 1 to 3 of interlace numbers in interlace number calculator 205 will be described.

Calculation Example 1

Interlace number calculator 205 of terminal 200 determines a frequency resource for transmitting PRACH (in other words, interlace number for each cluster block), based on "interlace number for each cluster block" included in the control information indicated by base station 100.

Note that, "interlace number for each cluster block" may be indicated by base station 100 to terminal 200 via higher layer signaling (e.g., radio resource control (RRC)) or dynamic signaling (e.g., downlink control information (DCI)). Furthermore, "interlace number for each cluster block" is not limited to be indicated from base station 100 to terminal 200, and for example, may be specified by specification.

As described above, by changing an interlace number for each cluster block, the power of side lobes in autocorrelation properties of PARCH transmitted by terminal 200 can be reduced, and base station 100 can improve the estimation accuracy of uplink transmission timing.

Hereinafter, Configuration Examples 1 and 2 for an interlace number for each cluster block will be described.

Configuration Example 1

In Configuration Example 1, as illustrated in FIG. 14, among interlaces to be assigned to PRACH, an interlace number included in even number cluster blocks and an interlace number included in odd number cluster blocks are different. In FIG. 14, the even number cluster blocks are assigned interlace number 0 whereas the odd number cluster blocks are assigned interlace number 1.

According to Configuration Example 1, the interlace numbers used in PRACH are few in number (0 or 1 in FIG. 14), so that the band to which PRACH is assigned in each cluster block is limited. Thus, frequency multiplexing of PRACH and another channel (e.g., PUSCH or the like) becomes easy. Furthermore, in Configuration Example 1, the effect of suppressing degradation of CM properties is brought about as in case 1 mapping described above.

Note that, the interlace numbers illustrated in FIG. 14 are only exemplary and another interlace number may be assigned.

Configuration Example 2

In Configuration Example 2, as illustrated in FIG. 15, the interlace numbers of the respective cluster blocks to be assigned to PRACH are configured using pseudo random numbers or random numbers.

The term "random numbers" herein refers to values that satisfy at least one of the following definitions.

(1) Interlace numbers of adjacent cluster blocks are different.

(2) Interlace numbers of the respective cluster blocks are calculated using all the values of interlace numbers available for PRACH (e.g., 0, 1, . . . , M (M=maximum interlace number)).

As in Configuration Example 2, since the interlace numbers of the respective cluster blocks are configured using random numbers, as with case 2 mapping described above (e.g., see FIG. 8), the effect of reducing the power of side lobes in autocorrelation properties of PRACH becomes large. Thus, base station 100 can improve the estimation accuracy of uplink transmission timing.

Note that, the interlace numbers illustrated in FIG. 15 are only exemplary and another interlace number may be assigned.

Moreover, in order to suppress the impact of PSD limit which is a regulation of an unlicensed band, interlace numbers of adjacent cluster blocks may be configured to satisfy the following expression:

[Expression 1]

$$(InterlaceNo_{k-1} - InterlaceNo_k) < X \qquad \text{(Expression 1)}$$

In order to suppress the impact of PSD limit, for example, "X" may be configured such that an interval of interlaces of adjacent cluster blocks (e.g., cluster block #k and cluster block #k−1) makes the interlaces to be distant from each other by 1 MHz or more.

Configuration Examples 1 and 2 of interlace numbers for each cluster block have been described, thus far.

As described above, in Calculation Example 1, the interlace number of an interlace forming a resource to which PRACH is assigned is configured for each of a plurality of cluster blocks. More specifically, among the interlaces forming an allocation resource to which PRACH is assigned, an interlace number included in at least one of a plurality of cluster blocks and an interlace number included in another one of the cluster blocks are different. In other words, PRACH is transmitted using resources of at least two types of interlace numbers.

Accordingly, the power of side lobes in autocorrelation properties in PRACH can be reduced, and base station 100 can improve the estimation accuracy of uplink transmission timing.

Moreover, the improved amount of the estimation accuracy of uplink transmission timing in base station 100 differs between Configuration Examples 1 and 2. More specifically, the estimation accuracy of uplink transmission timing in Configuration Example 2 is higher than the estimation accuracy of uplink transmission timing in Configuration Example 1.

In this respect, base station 100 and terminal 200 may switch a configuration method of an interlace number of each cluster block (e.g., Configuration Examples 1 and 2) in accordance with the timing estimation accuracy required in application of PRACH, such as initial access, handover, timing correction, or beam recovery, for example. As in the case of initial access, for example, when base station 100 is required to perform only approximate timing estimation, Configuration Example 1 may be applied. Meanwhile, in a case where more accurate timing estimation is required in base station 100, Configuration Example 2 may be applied.

Calculation Example 2

In Calculation Example 1, a case where an interlace number of each cluster block is indicated to terminal 200 from base station 100 or a case where an interlace number is previously specified by specification has been described.

Meanwhile, in Calculation Example 2, interlace number calculator 205 of terminal 200 calculates an interlace number of each cluster block based on one interlace number included in control information indicated from base station 100, and in accordance with regulatory rules or calculation formula.

In other words, in Calculation Example 2, an interlace number of an interlace for each cluster block, which forms a resource to which PRACH is assigned, is determined based on common interlace numbers among a plurality of cluster blocks.

According to Calculation Example 2, since one interlace number is indicated for a plurality of cluster block numbers, signaling overhead can be reduced.

Furthermore, according to Calculation Example 2, by changing an interlace number of each cluster block, using one interlace number to be indicated, as in Calculation Example 1, the power of side lobes in autocorrelation properties in PRACH transmitted by terminal 200 can be reduced, and base station 100 can improve the estimation accuracy of uplink transmission timing.

Hereinafter, Configuration Examples 1 and 2 of interlace numbers of each cluster block will be described.

Configuration Example 1

In Configuration Example 1, interlace number calculator 205 of terminal 200, for example, configures one indicated interlace number for even number cluster blocks, and configures an interlace number obtained by adding an offset to the one indicated interlace number for odd number cluster blocks.

Note that, the value of offset may be indicated from base station 100 to terminal 200 as part of control information or may be set as system common information specified by specification and does not have to be indicated from base station 100 to terminal 200.

In a case where an interlace number to be indicated from base station 100 to terminal 200 is set to "0" and the value of offset is set to "1," for example, an interlace number of each cluster block similar to the interlace number in Calculation Example 1 of Configuration Example 1 (e.g., see FIG. 14) is calculated.

Note that, interlace number calculator 205 may configure one indicated interlace number for odd number cluster blocks and configure an interlace number obtained by adding an offset to the one indicated interlace number for even number cluster blocks.

Furthermore, an offset to be added to one interlace number may be configured for each of an even number cluster block and an odd number cluster block. In a case where one interlace number indicated from base station 100 to terminal 200 is set to "0," and the value of offset for even number cluster blocks is set to "0," and the value of offset for odd number cluster blocks is set to "1," for example, an interlace number of each cluster block similar to the interlace number of Configuration Example 1 of Calculation Example 1 (see, e.g., FIG. 14) is calculated.

Note that, the offset is not limited to "0" or "1." The offset needs to be different at least between an even number cluster block and an odd number cluster block.

Configuration Example 2

In Configuration Example 2, interlace number calculator 205 of terminal 200 calculates interlace number "InterlaceNo$_k$" of each cluster block (cluster block number k, k=0, 1, 2, . . . , k−1 (where "k" represents the number of cluster blocks)), using the following expression:

[Expression 2]

$$\text{InterlaceNo}_k = \text{mod}(\text{InterlaceNo} + \text{InterlaceOffset} \times k, \text{maxInterlaceNo}+1)$$ (Expression 2).

In Expression 2, InterlaceNo represents one interlace number indicated to terminal 200, InterlaceOffset represents an offset of an interlace number between cluster blocks, and maxInterlaceNo represents the maximum value of available interlace number. Note that, mod(X, Y) is a function that returns the residue of division of X by Y.

As illustrated in Expression 2, an offset (InterlaceOffset× k) to be added to one interlace number (InterlaceNo) is different for each cluster block (cluster block number k), so that interlace number (InterlaceNo$_k$) of each cluster block is different for each cluster block.

Calculation Example 3

In Calculation Example 1 or 2, a case has been described where all or some of interlace numbers are indicated from base station 100 to terminal 200. Meanwhile, in Calculation Example 3, interlace number calculator 205 of terminal 200 calculates an interlace number of each cluster block in accordance with regulatory rules or calculation formula without indication of an interlace number from base station 100.

According to Calculation Example 3, since no interlace number is indicated from base station 100 to terminal 200, signaling overhead can be reduced. Furthermore, according to Calculation Example 3, by changing an interlace number of each cluster block, the power of side lobes in autocorrelation properties in PRACH transmitted by terminal 200 can be reduced, and base station 100 can improve the estimation accuracy of uplink transmission timing as in the cases of Calculation Examples 1 and 2.

Hereinafter, a configuration example of an interlace number of each cluster block will be described.

Interlace number calculator 205 of terminal 200 calculates an interlace number "InterlaceNo$_k$" of each cluster block (cluster block number k, k=0, 1, 2, . . . , k−1 (where "k" represents the number of cluster blocks)) using the following expression:

[Expression 3]

$$\text{InterlaceNo}_k = \text{mod}(PN_k, \text{maxInterlaceNo}+1)$$ (Expression 3).

In Expression 3, $PN_k$ represents a pseudo random number sequence. In a case where an input argument of a function that calculates $PN_k$ is the same, the same random number (output value) is outputted in base station 100 and terminal 200. Interlace number calculator 205 (and interlace number determiner 102 of base station 100) may use, for example, a cell ID or a cluster block number or the like for the input argument of the function that calculates $PN_k$, for example.

As illustrated in Expression 3, interlace number (InterlaceNo$_k$) of each cluster block (cluster block number k) is configured using a pseudo random number ($PN_k$), there is a high possibility that the interlace number (InterlaceNo$_k$) will be different for each cluster block.

Calculation Examples 1 to 3 of interlace numbers have been described, thus far.

[PRACH FDM Resource Determination Methods]

Next, a description will be given of a determination method of an interlace number for each PRACH FDM resource in PRACH resource determiner 103 of base station 100 and PRACH resource determiner 206 of terminal 200.

An interlace (interlace number) assigned to a PRACH FDM resource (frequency resource on which PRACH is frequency multiplexed) configured for PRACH is configured based on an interlace number configured for each of a plurality of cluster blocks in interlace number determiner 102 and interlace number calculator 205, for example.

Note that, the number of PRACH FDM resources is indicated to terminal 200 by msg1-FDM which is higher layer signaling specified for NR PRACH, for example.

Hereinafter, Determination Methods 1 and 2 of PRACH FDM resources will be described.

<Determination Method 1>

In Determination Method 1, PRACH resource determiner 103 and PRACH resource determiner 206 calculate interlace number "InterlaceNo$_{k,n}$" of each PRACH FDM resource #n of cluster block #k in accordance with the following expression:

[Expression 4]

$$\text{InterlaceNo}_{k,n} = \text{mod}(\text{InterlaceNo}_k + \text{offset} \times (n-1), \text{maxInterlaceNo}+1) \quad \text{(Expression 4)}.$$

In Expression 4, InterlaceNo$_k$ represents an interlace number of cluster block number k to be inputted from interlace number determiner 102 or interlace number calculator 205. InterlaceNo$_k$, for example, may be determined based on any one of Calculation Examples 1 to 3 of interlace numbers described above.

Furthermore, in Expression 4, offset represents an offset value of an interlace number of each PRACH FDM resource, n represents a PRACH FDM resource number, and maxInterlaceNo represents the maximum number of an interlace number used for PRACH.

A case will be described where, for example, the number of cluster blocks is set to 10, interlace number 0 is configured for an even number cluster block as interlaceNo$_k$, interlace number 1 is configured for an odd number cluster block, offset is set to be 1, and maxInterlaceNo is set to 3. The interlace numbers of each PRACH FDM resource in this case are illustrated in FIG. 16, and a frequency resource allocation example for PRACH is illustrated in FIG. 17.

Figure 16:
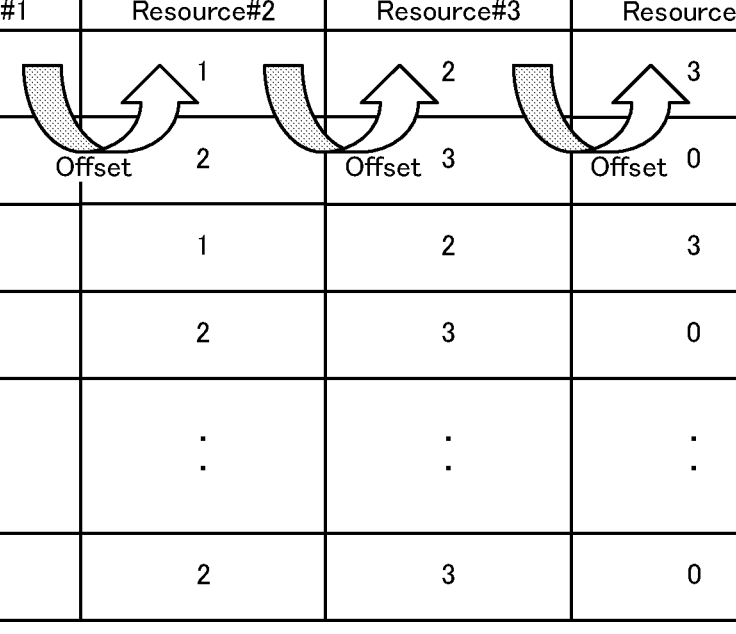
FIG. 16 is a diagram illustrating exemplary PRACH FDM resources according to PRACH-Resource Determination Method 1 of Embodiment 1.
Figure 17:
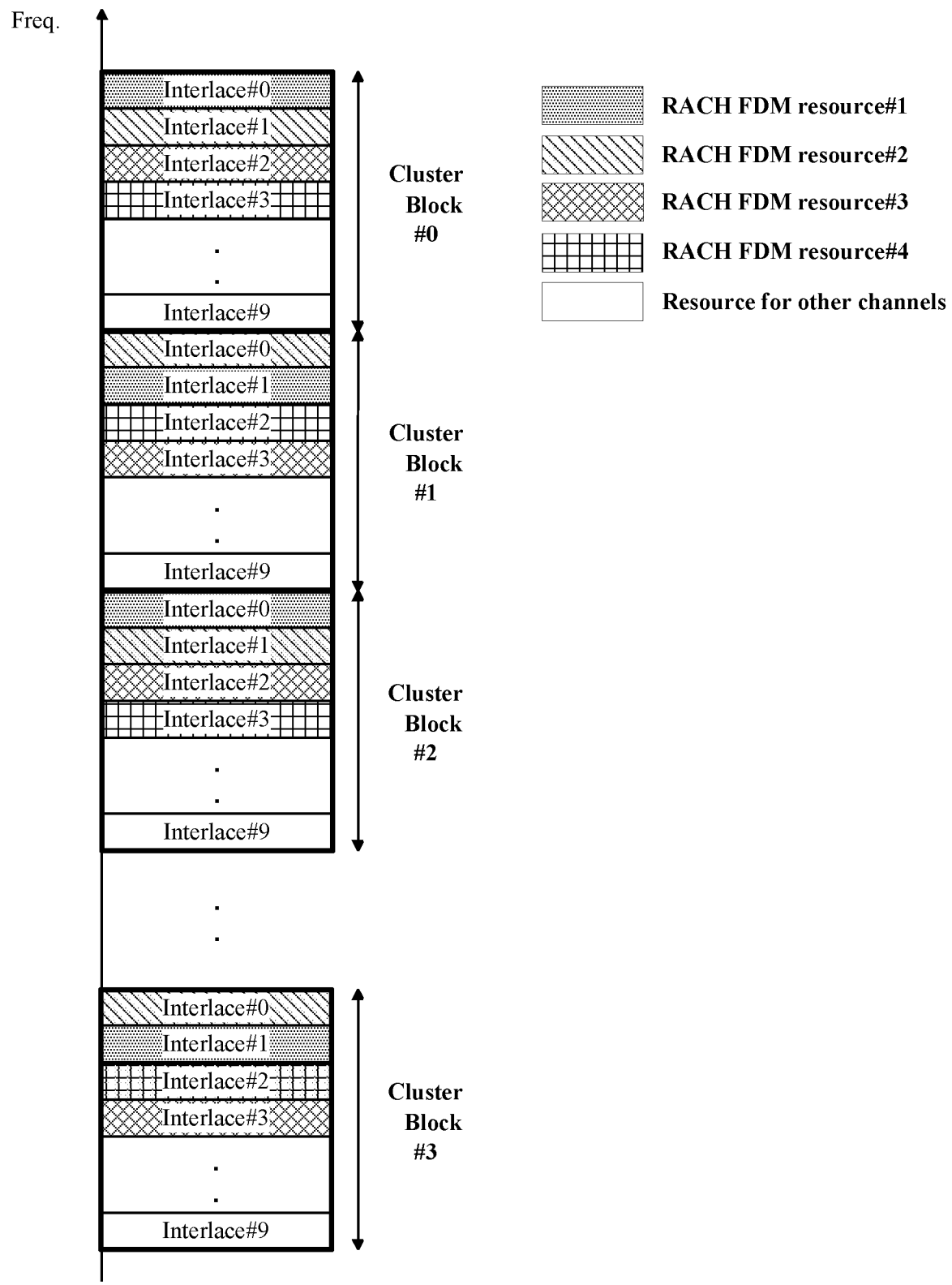
FIG. 17 is a diagram illustrating exemplary resource allocation according to PRACH-Resource Determination Method 1 of Embodiment 1.

As illustrated in FIG. 16 and FIG. 17, for example, PRACH FDM resource #1 (n=1) is assigned interlace number 0, PRACH FDM resource #2 (n=2) is assigned interlace number 1, PRACH FDM resource #3 (n=3) is assigned interlace number 2, and PRACH FDM resource #4 (n=4) is assigned interlace number 3 in even number cluster blocks.

Furthermore, as illustrated in FIG. 16 and FIG. 17, for example, PRACH FDM resource #1 (n=1) is assigned interlace number 1, PRACH FDM resource #2 (n=2) is assigned interlace number 2, PRACH FDM resource #3 (n=3) is assigned interlace number 3, and PRACH FDM resource #4 (n=4) is assigned interlace number 0 in odd number cluster blocks.

In Determination Method 1, PRACH resource determiner 103 and PRACH resource determiner 206 add a fixed offset value ((offset×(n−1)) configured for each PRACH FDM resource to interlace number (InterlaceNo$_k$) configured for each cluster block and calculates the residue of division by the maximum interlace number (maxInterlaceNo) available in PRACH.

Thus, as illustrated in FIG. 17, in each PRACH FDM resource, a different interlace number is assigned between an even number cluster block and an odd number cluster block. For this reason, in each PRACH FDM resource, the power of side lobes in autocorrelation properties in PRACH can be reduced, and base station 100 can improve the estimation accuracy of uplink transmission timing.

Furthermore, as illustrated in FIG. 17, in each cluster block, PRACH FDM resources #1 to #4 are configured with any one of interlace #0 to #3. As described above, all PRACH FDM resources are secured as a somewhat collective band (e.g., 4 interlaces (or 4 PRBs) in FIG. 17) in a frequency domain of each cluster block. For this reason, a collective band also as a band to which another channel is assignable is secured in each cluster block, so that the effect of making frequency multiplexing of PRACH with another channel easy can be obtained.

Note that, offset or maxInterlaceNo in Expression 4 may be indicated from base station 100 to terminal 200 as control information, or may not be indicated from base station 100 to terminal 200 as system common information specified by specification. Furthermore, a relationship between each cluster block and interlaces of PRACH FDM resources may be specified by specification without limitation to the case where the calculation formula of PRACH FDM resources is described in the specification.

<Determination Method 2>

In Determination Method 1, as illustrated in Expression 4, a case where an offset for an interlace number of each PRACH FDM resource is used has been described. Meanwhile, in Determination Method 2, a case where offsets for interlace numbers of each cluster block and each PRACH FDM resource are used will be described.

PRACH resource determiner 103 and PRACH resource determiner 206, for example, calculate an interlace number "InterlaceNo$_{k,n}$" of each cluster block #k and each PRACH FDM resource #n in accordance with the following expression:

[Expression 5]

$$\text{InterlaceNo}_{k,n} = \text{mod}(\text{InterlaceNo}_k + \text{offset}_{k,n}, \text{maxInterlaceNo}+1) \quad \text{(Expression 5)}.$$

In Expression 5, InterlaceNo$_k$ represents an interlace number of cluster block number k inputted from interlace number determiner 102 or interlace number calculator 205. InterlaceNo$_k$, for example, may be determined based on any one of Calculation Examples 1 to 3 of interlace numbers described above.

Furthermore, in Expression 5, offset$_{k,n}$ represents offset values for interlace numbers of each cluster block and each PRACH FDM resource, and maxInterlaceNo represents the maximum number of an interlace number used in PRACH.

A case will be described where, for example, the number of cluster blocks is set to 10, interlace number 0 is configured for an even number cluster block as interlaceNo$_k$, interlace number 1 is configured for an odd number cluster block, and maxInterlaceNo is set to 5. The interlace numbers of each PRACH FDM resource in this case are illustrated in FIG. 18.

Figure 18:
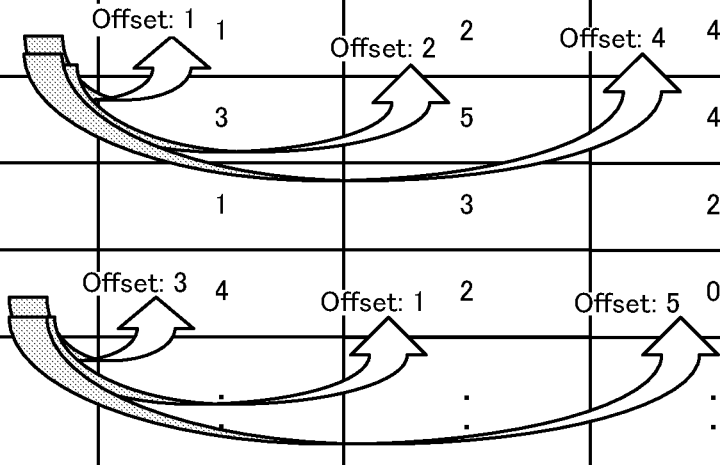
FIG. 18 is a diagram illustrating exemplary PRACH FDM resources according to PRACH Resource Determination Method 2 of Embodiment 1.

In FIG. 18, as an example, the following are set in cluster block #0 (k=0): offset for PRACH FDM resource #2 (n=2) is offset$_{0,2}$=1; offset for PRACH FDM resource #3 (n=3) is offset$_{0,3}$=2; and offset for PRACH FDM resource #4 (n=4) is offset$_{0,4}$=4. Note that, in FIG. 18, offset for PRACH FDM resource #1 (n=1) of cluster block #0 (k-0) is offset$_{0,1}$=0.

Moreover, in FIG. 18, as an example, the following are set in cluster block #3 (k=3): offset for PRACH FDM resource #2 (n=2) is offset$_{3,2}$=3; offset for PRACH FDM resource #3 (n=3) is offset$_{3,3}$=1; and offset for PRACH FDM resource #4 (n=4) is offset$_{3,4}$=5. Note that, in FIG. 18, offset for PRACH FDM resource #1 (n=1) of cluster block #3 (k=3) is offset$_{3,1}$=0.

As illustrated in FIG. 18, for example, PRACH FDM resource #1 (n=1) is assigned interlace number 0, PRACH FDM resource #2 is assigned interlace number 1, PRACH FDM resource #3 is assigned interlace number 2, and PRACH FDM resource #4 is assigned interlace number 4 in cluster block #0. In addition, as illustrated in FIG. 18, PRACH FDM resource #1 is assigned interlace number 1, PRACH FDM resource #2 is assigned interlace number 4, PRACH FDM resource #3 is assigned interlace number 2, and PRACH FDM resource #4 is assigned interlace number 0 in cluster block #3.

Note that, in FIG. 18, for other cluster blocks, interlace numbers are assigned in a manner similar to those for cluster block #0 or cluster block #3.

As described above, in Determination Method 2, offset values for interlace numbers are indicated for each cluster block and also each PRACH FDM resource. Thus, as illustrated in FIG. 18, for example, there occurs a difference in distribution of interlace numbers in a plurality of cluster blocks for each PRACH FDM resource. Accordingly, a difference in CM properties for each PRACH FDM resource varies. In other words, a PRACH FDM resource having favorable CM properties and a PRACH FDM resource having poor CM properties are both present.

Thus, for example, among PRACH FDM resources used by terminal 200 for PRACH transmission, the CM of PRACH becomes high in a certain PRACH FDM resource while there is a high possibility that the CM of PRACH will become low in another PRACH FDM resource. In this respect, in a case where a PRACH FDM resource used by terminal 200 for PRACH transmission is randomly determined, the impact of degradation of CM properties can be randomized. Thus, it is made possible to prevent the CM from becoming high over PRACH FDM resources of a plurality of cluster blocks in which PRACH is transmitted. Accordingly, for example, it is made possible to prevent the power consumption amount of terminal 200 from becoming high and thus causing a reduction in battery life of terminal 200.

Furthermore, for example, in a case where base station 100 determines a PRACH FDM resource of each terminal 200 during scheduling, base station 100 may allocate a PRACH FDM resource having poor CM properties to terminal 200 having small pathloss, and allocate a PRACH FDM resource having favorable CM properties to terminal 200 having large pathloss. Thus, the impact caused by degradation of CM properties can be suppressed.

Note that, offset$_{k,n}$ or maxInterlaceNo illustrated in Expression 5 may be indicated from base station 100 to terminal 200 as control information, or may be set as system common information specified by specification and does not have to be indicated from base station 100 to terminal 200.

Furthermore, instead of offset of Expression 5, the offset amount of each cluster block may be the same, and a parameter (e.g., Offset) having a different offset amount for each PRACH FDM resource may be used. In this case as well, the CM properties of each PRACH FDM resource can be different.

PRACH FDM resource determination methods 1 and 2 have been described, thus far.

As described above, in this embodiment, a configuration method of an interlace forming a PRACH FDM resource to which PRACH is assigned is different for each of a plurality of cluster blocks in base station 100 and terminal 200. An interlace number included in at least one of a plurality of cluster blocks and an interlace number included in another one of the plurality of cluster blocks are made different from each other, for example.

Thus, as compared with B-IFDMA described above, the power of side lobes in autocorrelation properties in PRACH can be reduced. Thus, in a case where terminal 200 transmits PRACH, it is made possible to prevent degradation of the estimation accuracy of uplink transmission timing in base station 100 and to improve the uplink reception performance in base station 100.

As described above, according to the present embodiment, terminal 200 can appropriately transmit PRACH in an unlicensed band.

Embodiment 2

In NR, the transmission timing of PRACH is indicated to a terminal by control information called, Radom access configurations, for example.

Figures 19, 20:
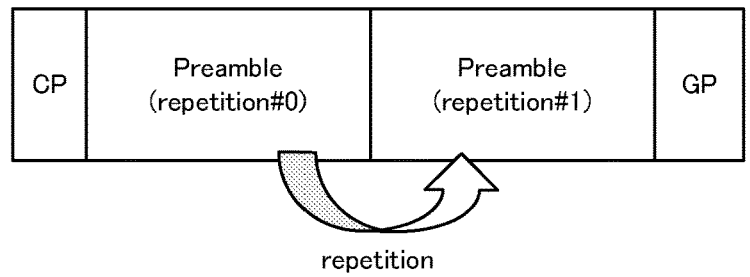
FIG. 19 is a diagram illustrating exemplary random access configurations.
FIG. 20 is a diagram illustrating an exemplary PRACH repetition configuration.

FIG. 19 illustrates exemplary Radom access configurations.

A terminal can recognize, on the basis of a PRACH configuration Index indicated in Random access configurations illustrated in FIG. 19, a parameter, such as a system frame number (SFN), a subframe number, and/or a symbol capable of PRACH transmission, for example.

Furthermore, a terminal can transmit PRACH, using a plurality of subframe numbers depending on a value of PRACH configuration Index illustrated in FIG. 19. With PRACH configuration Index=87, for example, PRACH can be transmitted using Subframe number=4, 9, for example.

Furthermore, a terminal can recognize a configuration of PRACH (e.g., CP length, preamble length, the number of repetitions of preamble, GP length, and/or the like) based on "Preamble format" illustrated in FIG. 19. In a case where "Preamble format" is A1, for example, in FIG. 19, the preamble is configured with twice repetitions (repetition number 0, repetition number 1) as illustrated in FIG. 20. Note that, the number of repetitions of a preamble is not limited to twice and may be three times or more (e.g., four times).

In this embodiment, as with Embodiment 1, by changing an interlace number used for PRACH transmission for each cluster block, the estimation accuracy of uplink transmission timing in a base station is improved. There is, however, a possibility that the CM properties degrade depending on a cluster block-interlace mapping pattern.

In this respect, a cluster block-interlace mapping is changed in accordance with transmission timing of PRACH in this embodiment. Thus, an effect of randomizing degradation of CM properties is obtained.

Note that, a base station and a terminal according to Embodiment 2 have basic configurations common to base station 100 and terminal 200 according to Embodiment 1, so that a description will be given while FIG. 11 and FIG. 12 are incorporated herein. More specifically, in this embodiment, operations of interlace number determiner 102 of base station 100 and interlace number calculator 205 of terminal 200 are different from their respective operations in Embodiment 1.

Interlace number determiner 102 and interlace number calculator 205 change a cluster block-interlace mapping table in accordance with the transmission timing of PRACH, for example. In other words, interlace number determiner 102 and interlace number calculator 205 change, in accordance with the transmission timing of PRACH, an interlace number of an interlace of each of a plurality of cluster blocks, which forms an allocation resource to which PRACH is assigned (hereinafter, referred to as "interlace hopping").

A parameter indicating the transmission timing of PRACH may be, for example, at least one of the SFN, subframe number, symbol number, and repetition number, and may be another parameter relating to the transmission timing of PRACH.

FIG. 21 illustrates, as an example, a configuration example of interlace numbers of each cluster block in accordance with subframe numbers (subframe #4 and subframe #9 in FIG. 21) used in PRACH transmission. As illustrated in FIG. 21, interlace number 0 is configured in even number cluster blocks and interlace number 1 is configured in odd number cluster blocks in subframe #4. Meanwhile, as illustrated in FIG. 21, interlace number 0 is configured in the even number cluster blocks and interlace number 3 is configured in the odd number cluster blocks in subframe #9.

As described above, according to the present embodiment, base station 100 and terminal 200 change an interlace number for each cluster block in accordance with the transmission timing of PRACH. Thus, the effect of randomizing degradation of CM properties is obtained because a different interlace number is configured for each PRACH transmission in each cluster block.

Although the CM of PRACH becomes high at a certain transmission timing, there is a high possibility that the CM of PRACH will become low at another transmission timing, for example. Thus, it is made possible to prevent a situation where the CM becomes high at a plurality of transmission timings. Accordingly, it is made possible to prevent the power consumption amount of terminal 200 from becoming high and thus causing a reduction in battery life of terminal 200.

Note that, subframe #4 and subframe #9 (e.g., PRACH Configuration Index=87 or 89 in FIG. 19) are only exemplary and the subframe number used for PRACH transmission may be another subframe number.

Furthermore, the cluster block-interlace mapping table in each subframe number is not limited to the example illustrated in FIG. 21. The cluster block-interlace mapping tables illustrated in FIG. 14 and FIG. 15 described in Embodiment 1, for example, may be configured at each transmission timing. Furthermore, interlace hopping is not limited to be between subframe numbers and may be applied to another transmission timing. Interlace hopping may be applied, for example, between two repetition numbers as illustrated in FIG. 20.

Furthermore, in a case where a frequency change between terminal 200 and base station 100 is large, interlace hopping between repetition numbers does not have to be applied. In a case where terminal 200 performs repetition of a PRACH preamble, base station 100 which is a reception side performs coherent combining of a preamble to which repetition has been applied. For this reason, in terminal 200, assignment to the same frequency resource without application of interlace hopping to a preamble to which repetition is applied makes it possible to reduce a difference in frequency change between preambles to which repetition has been applied. Thus, the gain of coherent combining in base station 100 increases, and the preamble detection accuracy can be improved.

Furthermore, in a case where an interlace number of each cluster block is determined using a pseudo-random number, for example, base station 100 and terminal 200 may generate a pseudo-random number sequence based on the transmission timing of PRACH (e.g., SFN, subframe number, symbol number, repetition number and/or the like). As in the following expression, for example, an argument of a function that generates a pseudo-random number sequence may include a variable "TxTiming" indicating transmission timing (SFN, subframe number, symbol number, and/or repetition number). Thus, an interlace number based on a pseudo-random number sequence generated each transmission timing of PRACH is configured.

[Expression 6]

$$\text{InterlaceNo}_k = \text{mod}(PN_k(\text{TxTiming}), \max \text{InterlaceNo}+1) \quad \text{(Expression 6)}$$

Furthermore, interlace hopping may be controlled based on information other than transmission timing of PRACH. In a case where PRACH transmission is triggered by downlink control information (DCI), for example, application of interlace hopping may be controlled based on reception timing of DCI. Alternatively, terminal 200 may switch interlace hopping based on control information included in DCI. Switching an interlace of each cluster block by DCI allows interlace hopping to be more dynamically applied.

Each embodiment of the present disclosure has been described, thus far.

More Embodiments (1) In a case where a frequency bandwidth to which PRACH is assigned (e.g., system bandwidth) is larger than a predetermined bandwidth (e.g., 20 MHz) (e.g., 40 MHz, 80 MHz or 160 MHz or the like) in the embodiments described above, a cluster-interlace mapping table specified in the predetermined bandwidth (e.g., 20 MHz) may be used repeatedly in units of the predetermined bandwidth (e.g., 20 MHz). Thus, signaling overhead relating to interlace numbers can be reduced. Furthermore, multiplexing of signals of different bandwidths becomes easy.

(2) In the embodiments described above, a plurality of interlace numbers in a PRACH FDM resource of each cluster block may be used. FIG. 22 illustrates two interlace numbers are assigned in a PRACH FDM resource of each cluster block. In this case as well, as with the embodiments described above, the power of side lobes in autocorrelation properties in PRACH can be reduced, and it is made possible to prevent degradation of the estimation accuracy of uplink transmission timing in base station 100. Note that, the number of interlace numbers assigned in a PRACH FDM resource of each cluster block may be three or more.

(3) The number of offsets of an interlace number to be indicated to terminal 200 is not limited to one. An offset to be applied to each predetermined frequency band (e.g., every 20 MHz) or each of a plurality of interlace numbers in a cluster block may be indicated to terminal 200, for example.

(4) Among a plurality of cluster blocks, some cluster blocks may not include an applicable interlace number. In FIG. 23, for example, while interlace numbers are assigned to cluster blocks #0 to #8, no interlace number is assigned to cluster block #9.

Depending on the number of resources (e.g., the number of PRBs) forming a system band, for example, there may be a case where the resources cannot be uniformly divided for a plurality of cluster blocks. In this case, for example, an interlace number does not have to be configured for a cluster block to which a less number of resources (e.g., the number of PRBs) are assigned (e.g., cluster block #9 in FIG. 23) than another cluster block. In other words, no PRACH is transmitted in cluster block #9 illustrated in FIG. 23.

Note that, a cluster block configured with no interlace number is not limited to the last cluster block as in the case of FIG. 23 and may be any cluster block.

(5) Cluster block-interlace mapping may be configured for each subcarrier spacing (SCS).

Furthermore, in a case where the number of cluster blocks differs for each SCS (e.g., every 15 kHz, 30 kHz), a cluster block-interlace mapping table may be specified for an SCS having the largest number of cluster blocks as the basis. In this case, part of the cluster block-interlace mapping table specified for the SCS having the largest number of cluster blocks may be used for another SCS.

FIG. 24 illustrates an exemplary cluster block-interlace mapping table for two types (15 kHz and 30 kHz) of SCSs. In FIG. 24, the number of cluster blocks in case of SCS=15 kHz is set to N (where "N" is an integer equal to or greater than 4), and the number of cluster blocks in case of SCS=30 kHz is set to 4.

As illustrated in FIG. 24, a cluster block-interlace mapping table is specified for SCS=15 kHz. Furthermore, as illustrated in FIG. 24, part of the cluster block-interlace mapping table specified for SCS=15 kHz is applied to SCS=30 kHz.

Thus, the effect of reducing the signaling overhead for interlace numbers is brought about.

(6) A sequence having favorable CM properties (e.g., Zadoff-chu sequence number having low CM or the like) may be assigned to a PRACH resource to which cluster-interlace mapping involving poor CM properties is applied. Thus, while the CM properties in PRACH are improved, the power of side lobes in autocorrelation properties in PRACH can be reduced.

(7) In the embodiments described above, a description has been given with PRACH as an example of a transmission signal. The transmission signal, however, is not limited to PRACH. The transmission signal may be, for example, another signal transmitted from terminal 200 (corresponding to a transmission apparatus) to base station 100 (corresponding to a reception apparatus), or a transmission signal transmitted from base station 100 (corresponding to a transmission apparatus) to terminal 200 (corresponding to a reception apparatus).

The transmission signal may be, for example, a signal of another channel, such as PUSCH, sounding reference signal (SRS), physical downlink shared channel (PDSCH), physical broadcast channel (PBCH), and/or synchronizing signal (SS).

In case of PUSCH or PDSCH, for example, the same effects as the case of PRACH can be obtained by performing packet detection processing and timing estimation similar to PRACH, using a corresponding demodulation reference signal (DM-RS) on the receiving side.

(8) In the embodiments described above, a case has been described as an example, where the number of cluster blocks in a predetermined frequency band (e.g., system band) is set to 10, the number of interlaces in each cluster block is set to 10, and the number of subcarriers per interlace is set to 12 subcarriers. The number of cluster blocks, the number of interlaces in a cluster block, and the number of subcarriers forming an interlace are not limited to these numbers and may be other values.

(9) In the embodiments described above, an interlace may be called "cluster." More specifically, the following expression may be used: "a plurality of "clusters" are present in a cluster block."

Alternatively, a cluster block may be simply called a "cluster." More specifically, the following expression may be used: "a plurality of "interlaces" are present in a cluster."

More embodiments have been described, thus far.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A transmission apparatus according to the present disclosure includes: a transmission circuit, which in operation, transmits a signal; and a control circuit, which in operation, determines an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

In the transmission apparatus according to the present disclosure, each of the base units included in each of the plurality of bands is assigned a number, the base units to which an identical number is assigned are uniformly distributed over the plurality of bands, and among the base units forming the allocation resource, the number assigned to the base unit included in at least one of the plurality of bands and the number assigned to the base unit included in another one of the plurality of bands are different.

In the transmission apparatus according to the present disclosure, the number assigned to the at least one of the base units forming the allocation resource is configured for each of the plurality of bands.

In the transmission apparatus according to the present disclosure, the number assigned to the at least one of the base units forming the allocation resource, for each of the plurality of bands, is indicated to a terminal by higher layer signaling or is previously specified.

In the transmission apparatus according to the present disclosure, among the base units forming the allocation resource, the number assigned to the base unit included in at least even-numbered one of the plurality of bands and the number assigned to the base unit included in at least odd-numbered one of the plurality of bands are different.

In the transmission apparatus according to the present disclosure, the number assigned to the at least one of the base units forming the allocation resource, for each of the plurality of bands, is configured using a pseudo random number or a random number.

In the transmission apparatus according to the present disclosure, the number assigned to the at least one of the base units forming the allocation resource, for each of the plurality of bands, is determined based on a number common to the plurality of bands.

In the transmission apparatus according to the present disclosure, the number assigned to at least one of the base units of each of the plurality of bands is calculated by adding an offset to the number common to the plurality of bands, and the offset differs between at least even-numbered one of the plurality of bands and at least odd-numbered one of the plurality of bands.

In the transmission apparatus according to the present disclosure, the number assigned to the at least one of the base units forming the allocation resource, for each of the plurality of bands, is changed in accordance with a transmission timing of the signal.

In the transmission apparatus according to the present disclosure, at least one of the base units assigned to a plurality of frequency resources with which the signal is frequency multiplexed in each of the plurality of bands is configured based on the number assigned to the at least one of the base units configured for each of the plurality of bands.

In the transmission apparatus according to the present disclosure, the predetermined frequency band is a band within an unlicensed band, each of the plurality of bands obtained by dividing the predetermined frequency band is a cluster block, and each of the frequency resources respectively being the base units is an interlace composed of contiguous subcarriers.

A reception apparatus according to the present disclosure includes: a reception circuit, which in operation, receives a signal; and a control circuit, which in operation, determines an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

A transmission method according to the present disclosure includes: transmitting a signal; and determining an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

A reception method according to the present disclosure includes: receiving a signal; and determining an allocation resource to which the signal is assigned in a predetermined frequency band, in which the predetermined frequency band is divided into a plurality of bands, and each of the plurality of bands includes a plurality of frequency resources respectively being base units of resource allocation for the signal, the allocation resource is composed of at least one of the base units of each of the plurality of bands, and a configuration method of the at least one of the base units forming the allocation resource is different for each of the plurality of bands.

INDUSTRIAL APPLICABILITY

An aspect of this disclosure is useful in mobile communication systems.

REFERENCE SIGNS LIST

100 Base station
101, 204 Controller
102 Interlace number determiner
103, 206 PRACH resource determiner
104 Replica signal generator
105 Control information generator
106 Encoder and modulator
107, 209 Radio transmitter
108, 201 Antenna
109, 202 Radio receiver
110 Detector
200 Terminal
203 Demodulator and decoder
205 Interlace number calculator
207 Transmission signal generator
208 Resource allocator

The invention claimed is:

1. A transmission apparatus comprising:
   a transmission circuit, which, in operation, transmits a signal; and
   a control circuit, which, in operation, determines an allocation resource to which the signal is assigned in a predetermined frequency band, wherein
   the predetermined frequency band is divided into a plurality of bands, and each of the plurality of bands includes a plurality of frequency resources respectively being base units of resource allocation for the signal,
   the allocation resource is composed of at least one of the base units of each of the plurality of bands,
   each of the base units included in each of the plurality of bands is assigned a number,
   the base units to which an identical number is assigned are uniformly distributed over the plurality of bands,
   a configuration method of the at least one of the base units forming the allocation resource is different between the plurality of bands, and
   among the base units forming the allocation resource, the number assigned to the base unit included in at least one of the plurality of bands and the number assigned to the base unit included in another one of the plurality of bands are different.

2. The transmission apparatus according to claim 1, wherein the number assigned to the at least one of the base units forming the allocation resource is configured for each of the plurality of bands.

3. The transmission apparatus according to claim 2, wherein the number assigned to the at least one of the base units forming the allocation resource, for each of the plurality of bands, is indicated to a terminal by higher layer signaling or is previously specified.

4. The transmission apparatus according to claim 3, wherein, among the base units forming the allocation resource, the number assigned to the base unit included in at least even-numbered one of the plurality of bands and the number assigned to the base unit included in at least odd-numbered one of the plurality of bands are different.

5. The transmission apparatus according to claim 2, wherein the number assigned to the at least one of the base units forming the allocation resource, for each of the plurality of bands, is configured using a pseudo random number or a random number.

6. The transmission apparatus according to claim 1, wherein the number assigned to the at least one of the base units forming the allocation resource, for each of the plurality of bands, is determined based on a number common to the plurality of bands.

7. The transmission apparatus according to claim 6, wherein
the number assigned to at least one of the base units of each of the plurality of bands is calculated by adding an offset to the number common to the plurality of bands, and
the offset differs between at least even-numbered one of the plurality of bands and at least odd-numbered one of the plurality of bands.

8. The transmission apparatus according to claim 1, wherein the number assigned to the at least one of the base units forming the allocation resource, for each of the plurality of bands, is changed in accordance with a transmission timing of the signal.

9. The transmission apparatus according to claim 1, wherein at least one of the base units assigned to a plurality of frequency resources with which the signal is frequency multiplexed in each of the plurality of bands is configured based on the number assigned to the at least one of the base units configured for each of the plurality of bands.

10. The transmission apparatus according to claim 1, wherein
the predetermined frequency band is a band within an unlicensed band,
each of the plurality of bands obtained by dividing the predetermined frequency band is a cluster block, and
each of the frequency resources respectively being the base units is an interlace composed of contiguous subcarriers.

11. A reception apparatus comprising:
a reception circuit, which, in operation, receives a signal; and
a control circuit, which, in operation, determines an allocation resource to which the signal is assigned in a predetermined frequency band, wherein
the predetermined frequency band is divided into a plurality of bands, and each of the plurality of bands includes a plurality of frequency resources respectively being base units of resource allocation for the signal,
the allocation resource is composed of at least one of the base units of each of the plurality of bands,
each of the base units included in each of the plurality of bands is assigned a number,
the base units to which an identical number is assigned are uniformly distributed over the plurality of bands,
a configuration method of the at least one of the base units forming the allocation resource is different between the plurality of bands, and
among the base units forming the allocation resource, the number assigned to the base unit included in at least one of the plurality of bands and the number assigned to the base unit included in another one of the plurality of bands are different.

12. A transmission method comprising:
transmitting a signal; and
determining an allocation resource to which the signal is assigned in a predetermined frequency band, wherein
the predetermined frequency band is divided into a plurality of bands, and each of the plurality of bands includes a plurality of frequency resources respectively being base units of resource allocation for the signal,
the allocation resource is composed of at least one of the base units of each of the plurality of bands,
each of the base units included in each of the plurality of bands is assigned a number,
the base units to which an identical number is assigned are uniformly distributed over the plurality of bands,
a configuration method of the at least one of the base units forming the allocation resource is different between the plurality of bands, and
among the base units forming the allocation resource, the number assigned to the base unit included in at least one of the plurality of bands and the number assigned to the base unit included in another one of the plurality of bands are different.

13. A reception method comprising:
receiving a signal; and
determining an allocation resource to which the signal is assigned in a predetermined frequency band, wherein
the predetermined frequency band is divided into a plurality of bands, and each of the plurality of bands includes a plurality of frequency resources respectively being base units of resource allocation for the signal,
the allocation resource is composed of at least one of the base units of each of the plurality of bands,
each of the base units included in each of the plurality of bands is assigned a number,
the base units to which an identical number is assigned are uniformly distributed over the plurality of bands,
a configuration method of the at least one of the base units forming the allocation resource is different between the plurality of bands, and
among the base units forming the allocation resource, the number assigned to the base unit included in at least one of the plurality of bands and the number assigned to the base unit included in another one of the plurality of bands are different.

* * * * *